United States Patent
Bharrat et al.

(10) Patent No.: US 9,973,529 B1
(45) Date of Patent: May 15, 2018

(54) COMMUNICATIONS METHODS, SYSTEMS AND APPARATUS FOR PROTECTING AGAINST DENIAL OF SERVICE ATTACKS

(71) Applicant: Sonus Networks, Inc., Westford, MA (US)

(72) Inventors: Shaun Jaikarran Bharrat, Manalapan, NJ (US); Tolga Asveren, Bordentown, NJ (US); Justin Hart, Purton (GB)

(73) Assignee: Sonus Networks, Inc., Westford, MA (US)

( * ) Notice: Subject to any disclaimer, the term of this patent is extended or adjusted under 35 U.S.C. 154(b) by 173 days.

(21) Appl. No.: 15/016,157

(22) Filed: Feb. 4, 2016

(51) Int. Cl.
*H04L 29/06* (2006.01)

(52) U.S. Cl.
CPC ...... *H04L 63/1458* (2013.01); *H04L 63/1416* (2013.01)

(58) Field of Classification Search
CPC . H04L 63/14; H04L 63/1416; H04L 63/1441; H04L 63/1458; H04L 63/1466; H04L 9/002; G06F 21/55
See application file for complete search history.

(56) References Cited

U.S. PATENT DOCUMENTS

| | | | | |
|---|---|---|---|---|
| 2006/0064484 | A1* | 3/2006 | Fawcus | H04L 45/00 709/224 |
| 2011/0228794 | A1* | 9/2011 | Yong | H04L 1/1809 370/412 |
| 2015/0033014 | A1* | 1/2015 | McGrew | H04L 9/30 713/168 |
| 2016/0227434 | A1* | 8/2016 | Grinshpun | H04W 28/0289 |
| 2016/0381069 | A1* | 12/2016 | Chesla | H04L 45/74 726/23 |

* cited by examiner

*Primary Examiner* — Joseph P Hirl
*Assistant Examiner* — Chi Nguy
(74) *Attorney, Agent, or Firm* — Straub & Straub; Stephen T. Straub; Michael P. Straub

(57) ABSTRACT

The present invention relates to methods, systems and apparatus for mitigating denial of service attacks. One exemplary embodiment in accordance with the invention is a method of operating a communication system including the steps of receiving at a first device packets of a first packet flow; sending, from the first device, control information to a switch through which packets of the first packet flow pass or to a control device which controls the switch, the control information including a mask corresponding to a range of expected packet values to be used for determining which packets in the first packet flow should be dropped.

20 Claims, 17 Drawing Sheets

COMMUNICATIONS METHODS, SYSTEMS AND APPARATUS FOR PROTECTING AGAINST DENIAL OF SERVICE ATTACKS

FIELD OF INVENTION

The present invention relates to communications methods, systems and apparatus for protecting against attacks such as for example denial of service (DOS) attacks. The present invention further relates to communications methods, systems and apparatus for off-boarding the policing function for one or more confidential data streams to upstream networking switches in a manner that provides resilient protection against blind or static DOS attacks.

BACKGROUND

As network functions migrate to the cloud, services previously performed in a monolithic processor are separated and distributed among multiple entities/devices. This is advantageous since it not only allows more complex chaining of separate services but it also allows the execution of a service on the best-suited entity in the cloud. For example, the services provided by session border controllers (SBCs) are being virtualized and distributed into entities/devices in the cloud. This allows for the offloading of some of the packet-processing functionality of the (virtual) SBC into the hardware of the underlying (hardware enabled) network such as for example a software defined network (SDN) in which there is a decoupling of the system that makes decisions about where traffic is sent (the control plane) from the underlying systems that forward traffic to the selected destination (the data plane). While there are certain advantages to disaggregation of packet processing functionality, it also can result in the introduction of vulnerabilities such as denial of service vectors which significantly weaken the overall SBC service.

One area of particular concern is the support of secure streams when the packet processing is carried out in a distributed manner. Such processing is both compute intensive and network Input/Output (I/O) intensive. It is highly desirable to distribute this processing among multiple processors. In particular, it is desirable to move the packet policing to the underlying network hardware, e.g., SDN hardware, and reserve the SBC, e.g., virtual SBC, for the authentication and confidentiality function on the secure streams. However, as an example of the problems associated with such disaggregation, consider an implementation where the SBC manages the setup of the secure stream and installs a metered flow entry in the SDN with the expected steady-state rate and burst limits. The SDN will then police the stream to the specified limits, forward the allowed packets to the SBC, and then the SBC decrypts the stream and handles the rest of the processing. This approach however introduces vulnerabilities to some relatively straightforward and easy to implement attacks. For example, if an attacker can capture a single packet in a secure stream to the SBC, that attacker can then repeatedly resend the same packet. These attack packets will use up the policing credits in the SDN flow meter, eventually squeezing out packets from the valid stream. The fact that the bogus packets introduced by the attacker are in fact not acceptable for the secure stream is irrelevant because the policing happens before the validation. Furthermore, this attack is permanently effective, i.e., the entire rest of the secure stream is impaired as a result of the attack.

From the above discussion, it should be appreciated that there is a need for improved communications methods, systems and apparatus for improving the protection and resilience of secure communications systems against attacks such as DOS attacks. Furthermore, there is a need for communications methods, systems and apparatus that mitigates the effects of blind DOS attacks and static DOS attacks.

SUMMARY

The present invention is directed to various features relating to communications methods, systems and apparatus for protecting against and mitigating the effect of attacks such as Denial of Service attacks. The present invention addresses the problems described above.

One exemplary embodiment of the invention includes a method of operating a communication system, the method comprising: receiving at a first device packets of a first packet flow; sending, from the first device, control information to a switch through which packets of the first packet flow pass or to a control device which controls said switch, said control information including a mask corresponding to a range of expected packet values. In some embodiments, the method further includes that prior to sending said control information to the switch, operating the first device to monitor for a condition indicating an attack (e.g., denial of service attack) with respect to said first packet flow. In some, but not all embodiments of the exemplary method the monitoring is performed during a monitoring mode of operation, the method further including that in response to detecting a condition indicating an attack with respect to the first packet flow, operating the first device to switch from said monitoring mode to an attack mitigation mode of operation with respect to said first packet flow, said switching from the monitoring mode of operation to the mitigation mode of operation including said step of sending said control information including the mask corresponding to the range of expected packet values. The method in some embodiments includes operating the switch to give a higher priority to packets corresponding to said first flow which include a value matching said mask than to packets in said first flow which do not include a value which match said mask.

In some embodiments the first device is a Session Border Controller. In some embodiments the switch is an SDN switch such as for example an OpenFlow switch. In some embodiments the first device and switch are part of a SDN network. In some such embodiments, the control device is an SDN controller.

Another exemplary embodiment of the invention includes a communications system including a first device, the first device including an Input/Output interface for receiving packets of a first packet flow and sending control information to a switch through which packets of the first packet flow pass or to a control device which controls said switch, said control information including a mask corresponding to a range of expected packet values. In some embodiments, the first device of the communications system includes a processor, the processor being configured to control the first device to monitor for a condition indicating an attack (e.g., denial of service attack) with regard to said first packet flow when said first device is in a monitoring mode of operation with respect to said first packet flow. In some embodiments, the process included in the first device is further configured to control said first device to switch in response to detecting a condition indicating an attack with respect to the first packet flow from said monitoring mode of operation to an attack mitigation mode of operation with respect to said first packet flow, said switching from the monitoring mode of operation to the attack mitigation mode of operation including: generating said control information including said mask, and sending said control information including the mask corresponding to the range of expected packet values to said switch.

In some, but not all, embodiments, the processor of the first device is further configured to control said first device not to send to the switch or to the control device mask information to be used for determining which packets in said first packet flow should be dropped prior to detecting a condition indicating an attack with regard to said first packet flow.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
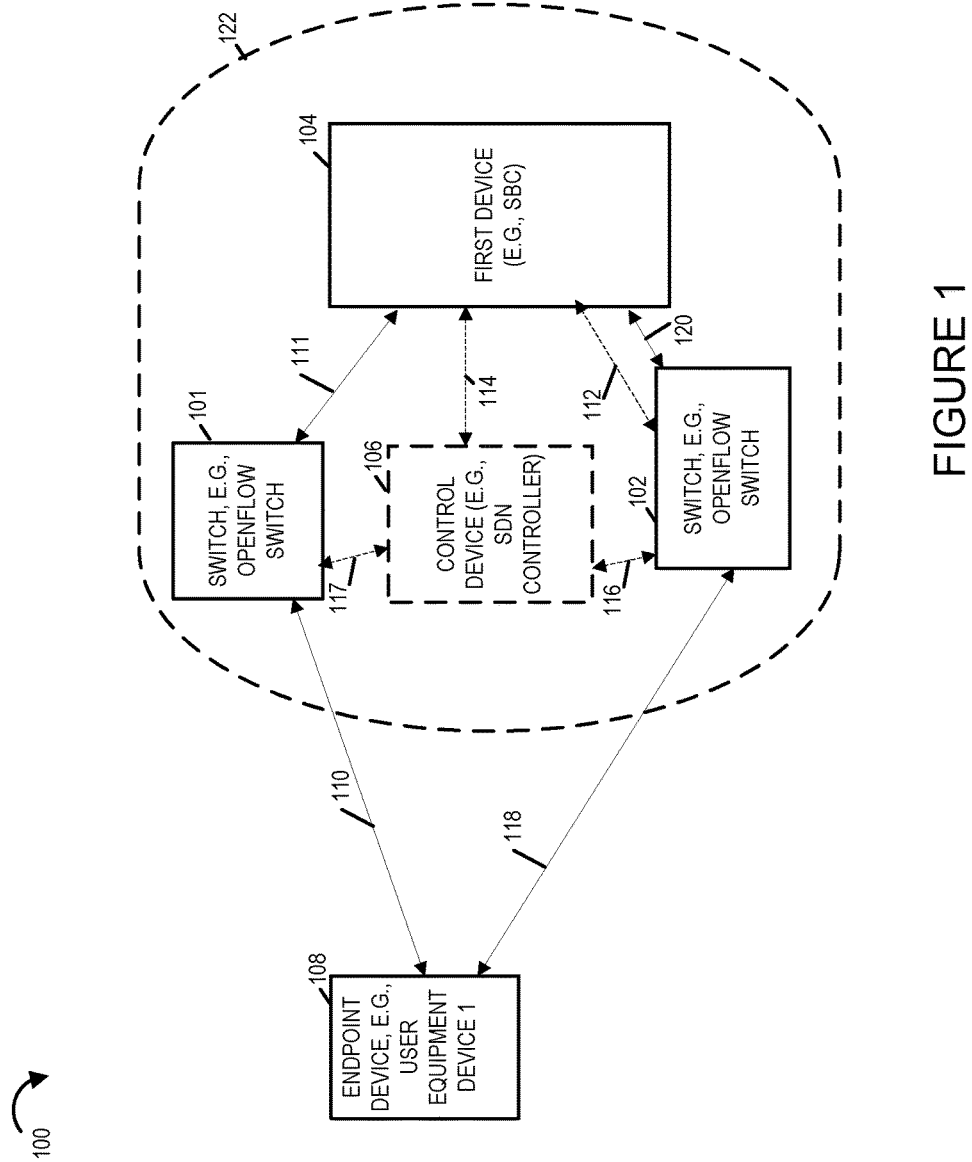
FIG. 1 illustrates an exemplary communications system in accordance with one embodiment of the present invention.

FIG. 1 illustrates an exemplary communications system 100 in accordance with an exemplary embodiment. Communications system 100 includes switches 101 and 102, e.g., communications switches such as for example OpenFlow Switches, a first device 104, e.g., a Session Border Controller, an endpoint device 108, a network 122, e.g., a software defined network such as an OpenFlow network, and an optional control device 106, e.g., a Software Defined Network (SDN) Controller. In some embodiments that include the optional control device 106, the control device 106 is co-located with either switch 101 or 102. The endpoint device 108 may be for example a user equipment device such as for example, a mobile or stationary communications device, such as a cellular phone, fixed wired phone, smartphone, tablet device, laptop computer or other communications device. The endpoint 108 may be, and in some embodiments is, a Session Border Controller.

The endpoint device 108 is coupled to switch 101 via communications link 110. The endpoint device 108 is coupled to switch 102 via a communications link 118. The switch 101 is coupled to the first device 104 via communications link 111. The switch 102 is coupled to the first device 104 via communications links 112 and 120. The first device 104 is coupled to the control device 106 via communications link 114. The control device 106 is coupled to the switch 101 via communications link 117. The control device 106 is coupled to the switch 102 via communications link 116. The various communications links 110, 111, 112, 114, 116, 117, 118, and 120 are used for communicating and exchanging information, signals and messages between the various devices of the communications system 100. In some embodiments, the communications links 112, 114, 116, and 117 are used for communicating control information and signals such as for example SDN control signals and information while the communications links 110 and 111 are used for communicating session control signaling information e.g., SIP signaling and communication links 118 and 120 are used for communicating data such as for example a media data packet flow.

Figure 1A:
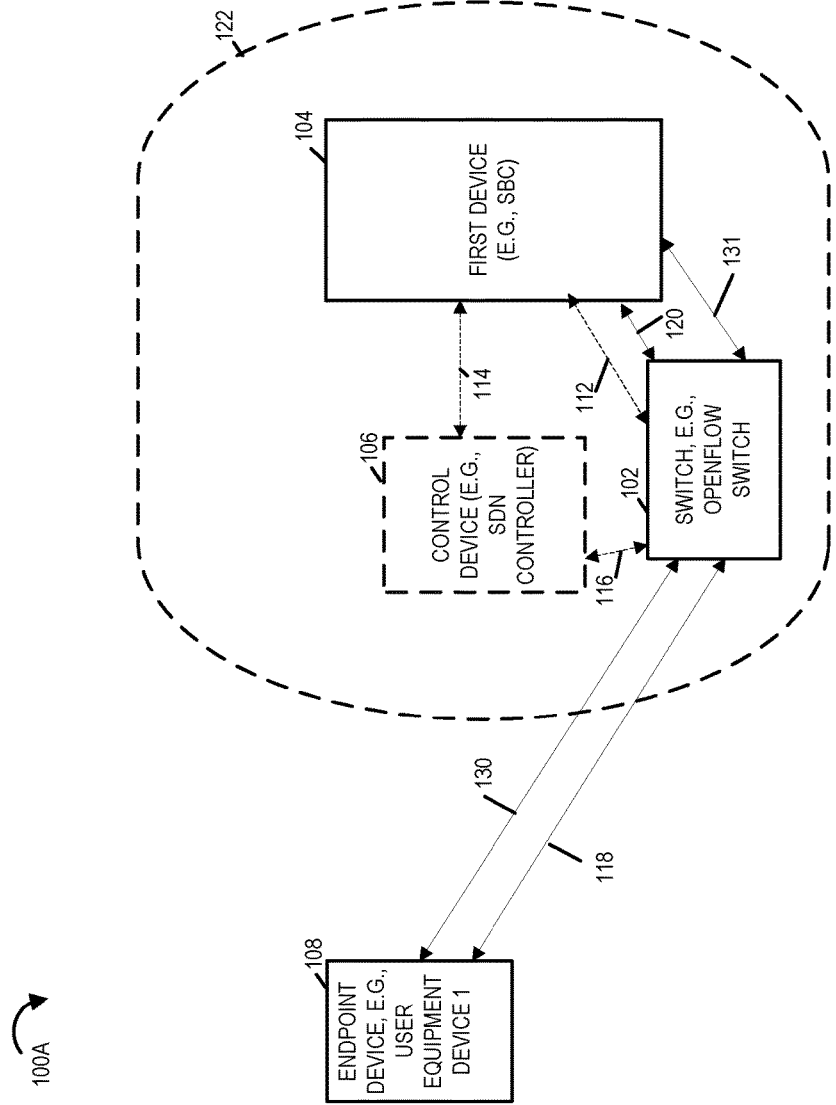
FIG. 1A illustrates another exemplary communications system in accordance with another embodiment of the present invention.

The endpoint device 108 communicates with the first device 104 via communications switch 101 to exchange session control signals such as for example SIP signals with the first device 104 via communications link 110 and communications link 111 as part of the negotiation for establishing a media session such as for example a Secure Real-time Transport Protocol (SRTP) media session between the endpoint 108 and the first device 104. In one embodiment, the negotiated path of the media session, e.g., the negotiated terms of the SRTP packet flow, includes the addressing information for the path from the endpoint 108 to the first device 104 via communications link 118, switch 102 and communications link 120. In some embodiments, the session control signal path is also routed through the switch 102 instead of through the separate switch 101. In some of these embodiments, the communications link 130 couples the endpoint 108 to switch 102 for communicating control signals and communications link 131 couples the switch 102 to the first device 104 for communicating control signals. System 100A of FIG. 1A shows this additional exemplary embodiment. In some embodiments, separate communications links 130 and 131 are not used and the control signals and media signals are both exchanged over communications links 118 and 120 instead.

Figure 1B:
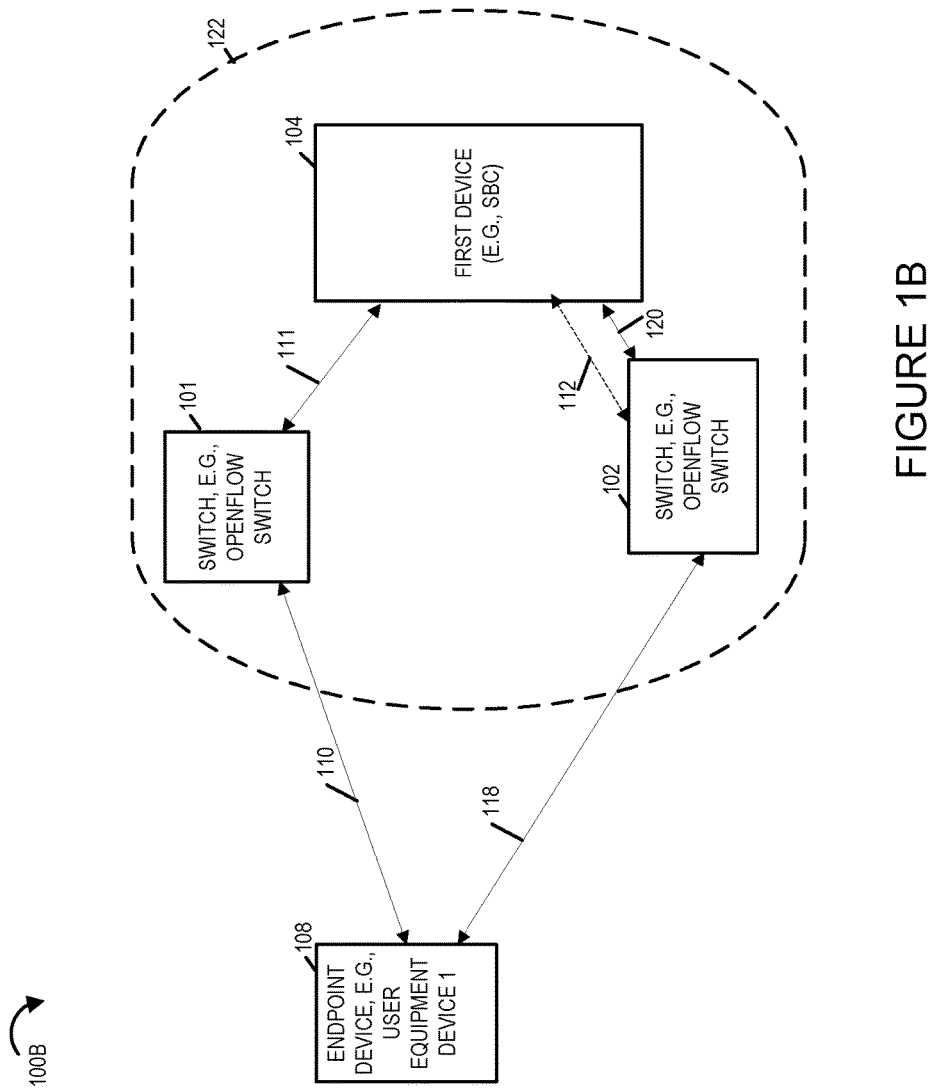
FIG. 1B illustrates another exemplary communications system in accordance with another embodiment of the present invention.

In some embodiments, the exemplary communications links 110 and 111 of system 100 and 100B of FIGS. 1 and 1B respectively are used for exchanging control signals such as for example Session Initiation Protocol signals between endpoint 108, the switch 101 and the first device 104. The control signals usually but not always include information to set up a media session and negotiate the 5-tuple information for a media session, such as for example a call session with a SRTP packet flow. In some embodiments, the communications links 118 and 120 shown in systems 100, 100A and 100B of FIGS. 1, 1A and 1B respectively are used for exchanging media, e.g., SRTP packets of a session established between the endpoint device 108, switch 102 and first device 104. The communications links 112 and 114 are used to exchange control information and instruction, e.g., SDN control information and instructions, between the first device 104 and the control device 106. In some embodiments, the communications links 117 and 116 are used to exchange control information and instructions, e.g., SDN control information and instructions, between the control device 106 and the switches 101 and 102 respectively. In some embodiments, a communications link between switch 101 and the first device 104 is also included which is used to exchange control information and instructions between the first device 104 and switch 101.

System 100B illustrated in FIG. 1B shows an exemplary embodiment which does not include the optional control device 106. In such systems, the first device 104 exchanges control information and instructions directly with the switch 102 via communications link 112.

Figure 2:
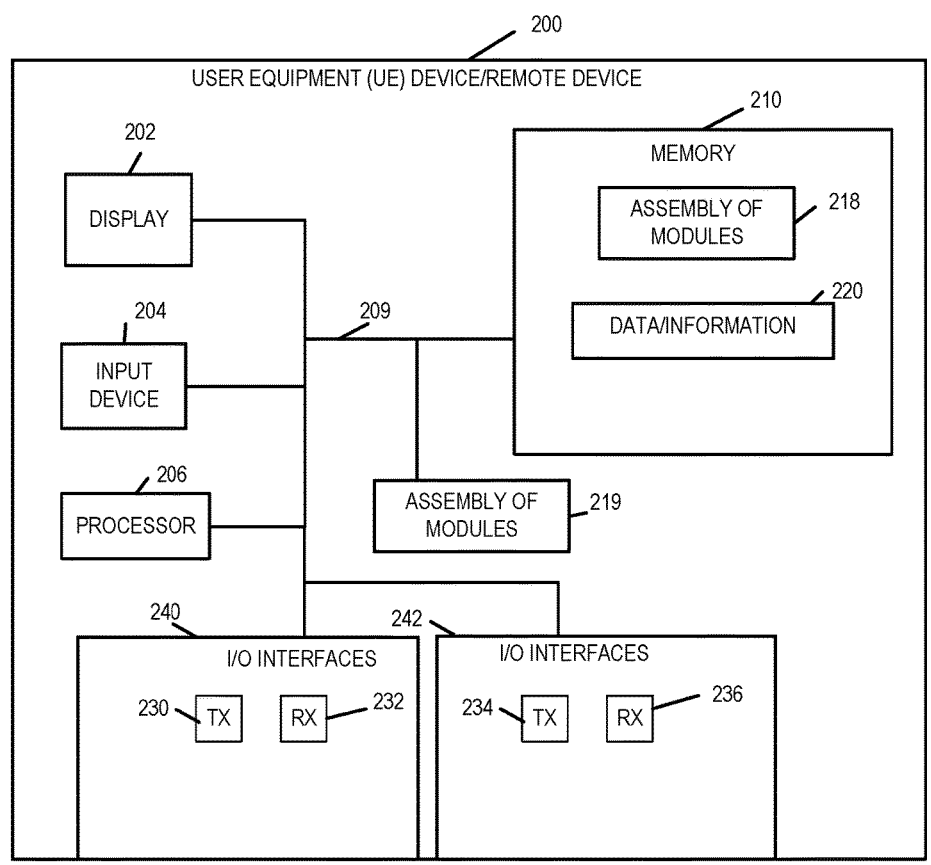
FIG. 2 illustrates an exemplary endpoint device shown as a user equipment device (UE) in accordance with one embodiment of the present invention.

FIG. 2 illustrates an exemplary embodiment of a Endpoint device, e.g., a User Equipment (UE) device in accordance with one embodiment of the present invention. Exemplary user equipment device/remote device 200 includes a display 202, an input device 204, a processor 206, e.g., a CPU, input/output (I/O) interfaces 240 and 242, which couple the UE to a core network or various other devices including e.g. switches 101 and 102, memory 210, and an assembly of modules 219, e.g., circuits corresponding to different modules, coupled together via a bus 209 over which the various elements may interchange data and information. Memory 210 includes an assembly of modules 218, e.g., an assembly of software modules, and data/information 220. The I/O interface 240 includes transmitters 230 and receivers 232. The I/O interface 242 includes transmitters 234 and receivers 236. The user equipment device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the UE 200 includes a communication module configured to operate using IP, TCP, UDP and SIP protocol signaling methods. In some embodiments, the communication module is a hardware module, a software module or a module including hardware and software components. In some embodiments, the endpoint device 108 of FIGS. 1, 1A and 1B are a user equipment device (UE 1) implemented in accordance with user equipment device/remote device 200 of FIG. 2.

Figure 3:
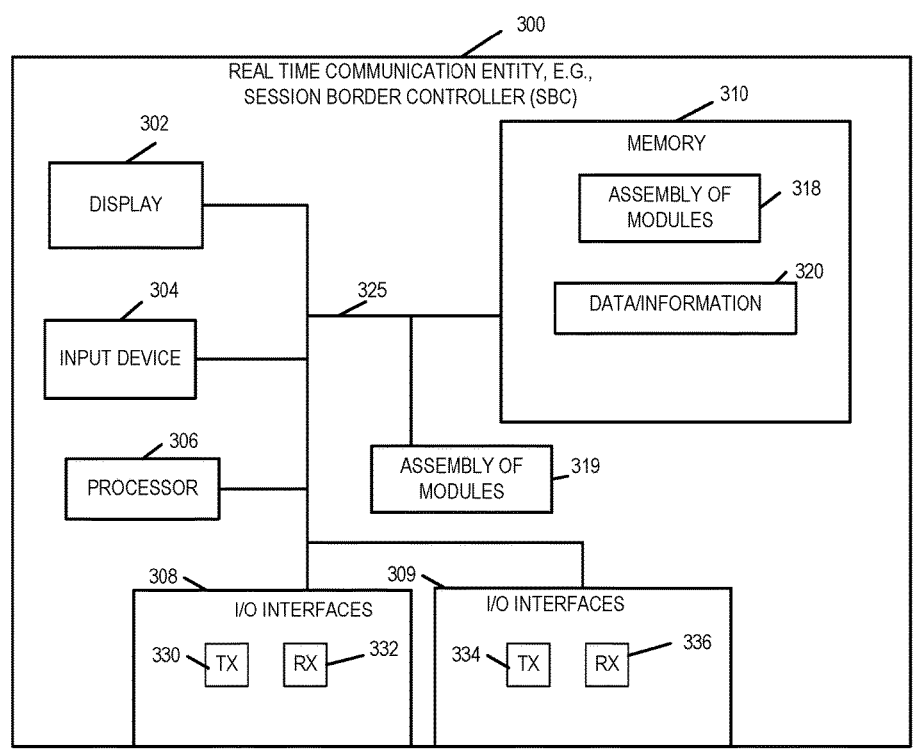
FIG. 3 illustrates an exemplary real time communication entity illustrated as a session border controller in accordance with one embodiment of the present invention.

FIG. 3 illustrates an exemplary embodiment of a real time communications entity which in this example is a Session Border Controller (SBC) 300 in accordance with one embodiment of the present invention. Exemplary session border controller 300 includes a display 302, an input device 304, a processor 306, e.g., a CPU, input/output (I/O) interfaces 308 and 309, which couple the SBC to a core network or various other devices including switches 101 and 102 and control device 106, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320. The I/O interfaces 308 include transmitters 330 and receivers 332. The I/O interfaces 309 include—transmitters 334 and receivers 336. The SBC 300 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments, a single public IP address/port pair is used for all signaling, e.g., SIP signaling relating to establishing sessions. In most, but not all embodiments, the IP/port number pairs used for media sessions are private IP/port number pairs. The signaling IP/port number pair for establishing the session being different from the IP/port number pair used for communicating media of a media session. In some embodiments, the SBC 300 does not include a display.

The I/O interfaces in some embodiments are configured to communicate in accordance with the IP, Transport Control Protocol (TCP), User Datagram Protocol (UDP), Session Initiation Protocol (SIP), Session Description Protocol (SDP), Openflow protocol and/or one or more proprietary signaling protocols. In some embodiments, the SBC 300 includes a communication module configured to operate using one or more IP, TCP, UDP, SIP, SDP, Openflow and/or proprietary protocol methods. In some embodiments, the communication module is a hardware module, a software module or a module including hardware and software components. In some embodiments, the first device 104 of FIGS. 1, 1A, and 1B is SBC 300 of FIG. 3. In some embodiments, the SBC 300 is implemented as a virtual machine operating on a computing device in the cloud.

Figure 4:
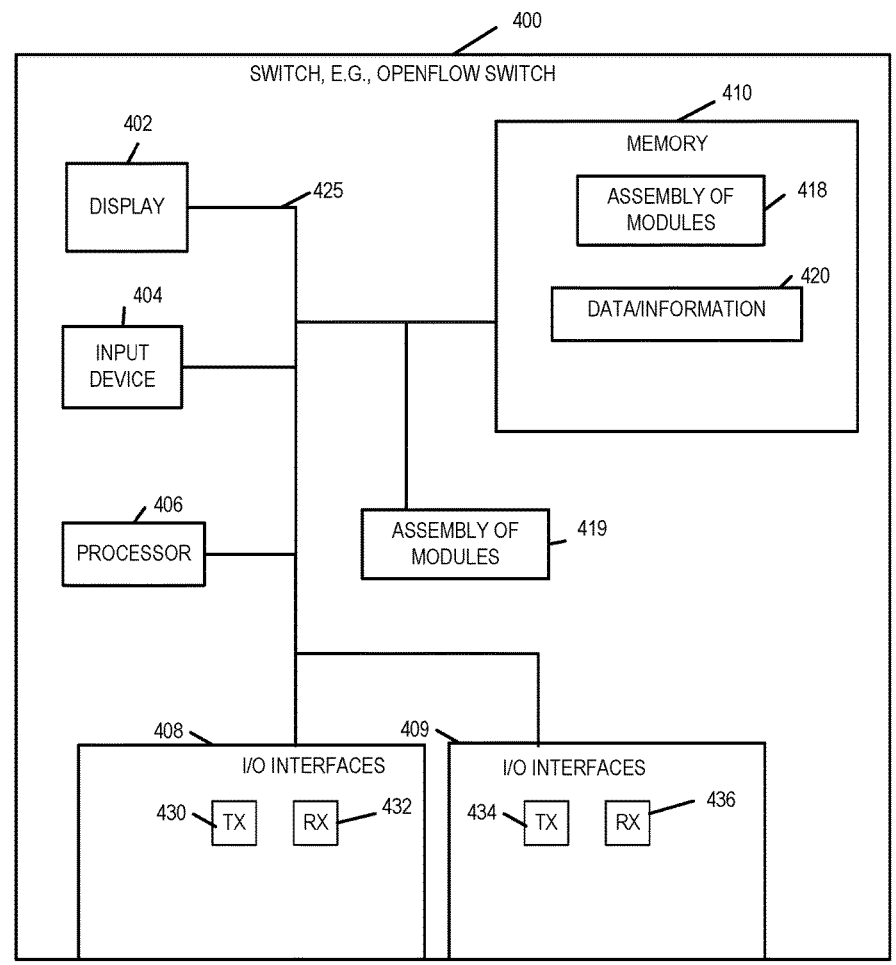
FIG. 4 illustrates an exemplary switch in accordance with one embodiment of the present invention.

FIG. 4 illustrates an exemplary embodiment of a switch device 400 in accordance with one embodiment of the present invention. Exemplary switch 400 includes a display 402, an input device 404, a processor 406, e.g., a CPU, input/output (I/O) interfaces 408 and 409, which couple the switch device to a core network or various other devices including for example remote devices, SBC devices, controller, other switch devices, and endpoint devices, such as user equipment, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420. The I/O interfaces 408 include transmitters 430 and receivers 432. The I/O interfaces 409 include transmitters 434 and receivers 436. The switch device is also configured to have a plurality of Internet Protocol (IP) address/port number pairs, e.g., logical IP address/port pairs, for use in exchanging signaling information, e.g., SIP signaling messages for establishing media sessions, and media, e.g., Secure Real-time Protocol Packets of a media session. The switch has a plurality of public IP/port number pairs as well as private IP/port number pairs used for media sessions.

The I/O interfaces in some embodiments are configured to communicate in accordance with the Internet Protocol, Transport Control Protocol, User Datagram Protocol (UDP), Session Initiation Protocol (SIP), Session Description Protocol (SDP), OpenFlow protocol and/or one or more proprietary protocols. In some embodiments, the switch 400 includes a communication module configured to operate using IP, TCP, UDP, SIP, SDP, OpenFlow protocol methods. In some embodiments, the communication module is a hardware module, a software module or a module including hardware and software components. In some embodiments, the switch devices 101 and 102 of FIGS. 1, 1A and 1B are implemented in accordance with switch device 400. In some embodiments, the switch is implemented on hardware such as computer hardware that is deployed in the cloud. In some embodiments, the switch is implemented as a virtual machine on computer hardware that may be deployed in the cloud or on the Internet.

Figure 5:
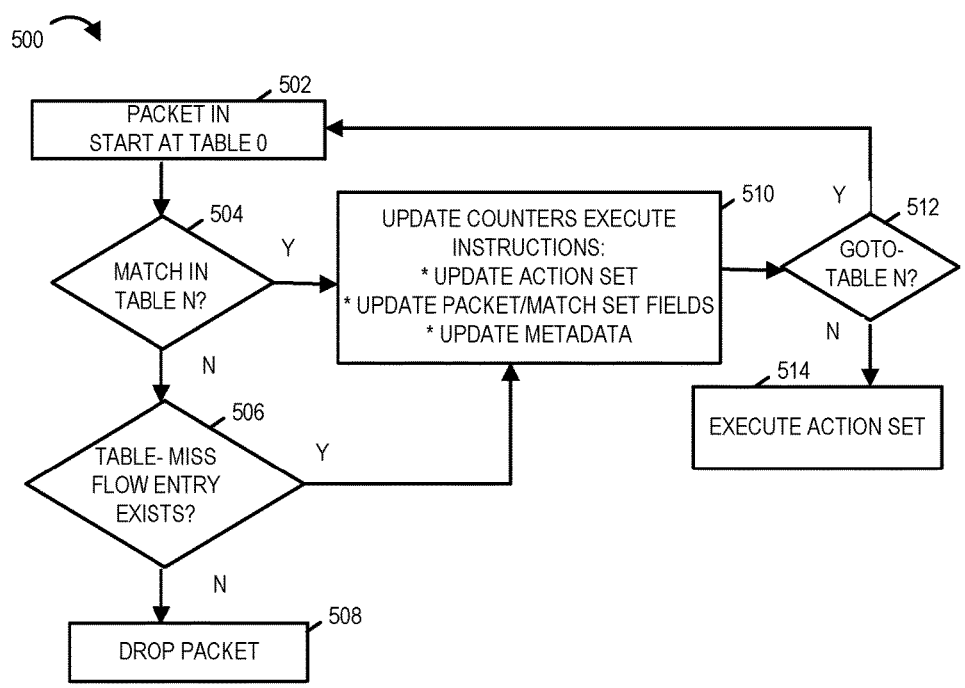
FIG. 5 illustrates a diagram of a high level path of a packet through an OpenFlow 1.4+ capable switch.

An exemplary embodiment of the present invention will now be explained using exemplary system 100 of FIG. 1. In the exemplary embodiment, there is a decomposition and distribution of the processing for secure streams between a first device 104 which in this example is an SBC, and a SDN comprised of network switches which apply packet rate policing to flows. Exemplary switch 102 of FIG. 1 is an OpenFlow 1.4+ capable switch. While in this example an OpenFlow switch has been shown other controllable switches may be, and in some embodiments, are used. Diagram 500 of FIG. 5 is a diagram from the OpenFlow 1.4 Specification, copyrighted 2013 published by The Open Networking Foundation, which illustrates the high level path of a packet through the exemplary switch 102.

A general high level explanation of diagram 500 will now be provided but a more detailed explanation may be found in the OpenFlow 1.4 Specification. In step 502 a packet is received at the switch and processing starts at table 0. Operation proceeds from step 502 to decision step 504. In decision step 504 a determination is made if there is a match in table N. If it is determined that there is a match operation proceeds to step 510. If there is not a match in Table N then operation proceeds to decision step 506. In decision step 506, the switch determines if a table-miss flow entry exists. If a table-miss flow entry exists then operation proceeds to step 510 otherwise operation proceeds to step 508. In step 508 the received packet is dropped.

Returning to step 510, in step 510 the switch updates counters and executes instructions. The action set is updated, the packet/match set fields are updated and the metadata is updated. Operation proceeds from step 510 to decision step 512. In decision step 512, the switch determines if processing in accordance with Table N is to be implemented. If the determination is yes, then operation proceeds to step 514 in which actions set in table N is executed. If it is determined in step 512 not to proceed to executing the instructions in table N then operation proceeds to step 502.

The architecture of the OpenFlow switch specifies a set of flow tables. Each flow table comprises flow entries consisting of matching criterion, priority, and actions. When a packet is received, it is matched against the entries in the first flow table and the highest priority match is selected. The actions for that match are then executed. These actions can be quite complex and can involve additional matching against more flow tables, etc. For the sake of simplicity and clarity with respect to explaining the invention, we will only discuss the action of the switch that specifies the packet must be processed by a meter. A meter has one or more meter bands. For a drop meter band, the band parameters include an allowed steady-state rate and a burst size. The specifics described above in connection with the exemplary switch 102 are particular to an OpenFlow switch supporting version 1.4 of the specification. Relevant functionality of the switch as it pertains to one or more embodiments of the present invention include that the switch should provide the ability to match a packet to a flow based on the contents of the Internet Protocol version 4 (IPv4) or Internet Protocol version 6 (IPv6) header, the UDP/TCP header, and a maskable bitmap of the packet contents, and the ability to apply leaky-bucket/token-bucket policing to packets matching that flow. Additionally, the switch should have the ability to dynamically add, remove, and modify parameters of both the flow, (e.g., by a change in the matching criterion) and the meter. In some embodiments, the switch includes one or more modules or logic that may be implemented in software, hardware, e.g., circuits, or a combination of software and hardware to perform the functionality described. In some embodiments, a processor and/or device in the switch performs the aforementioned functionality described.

Figure 6A:
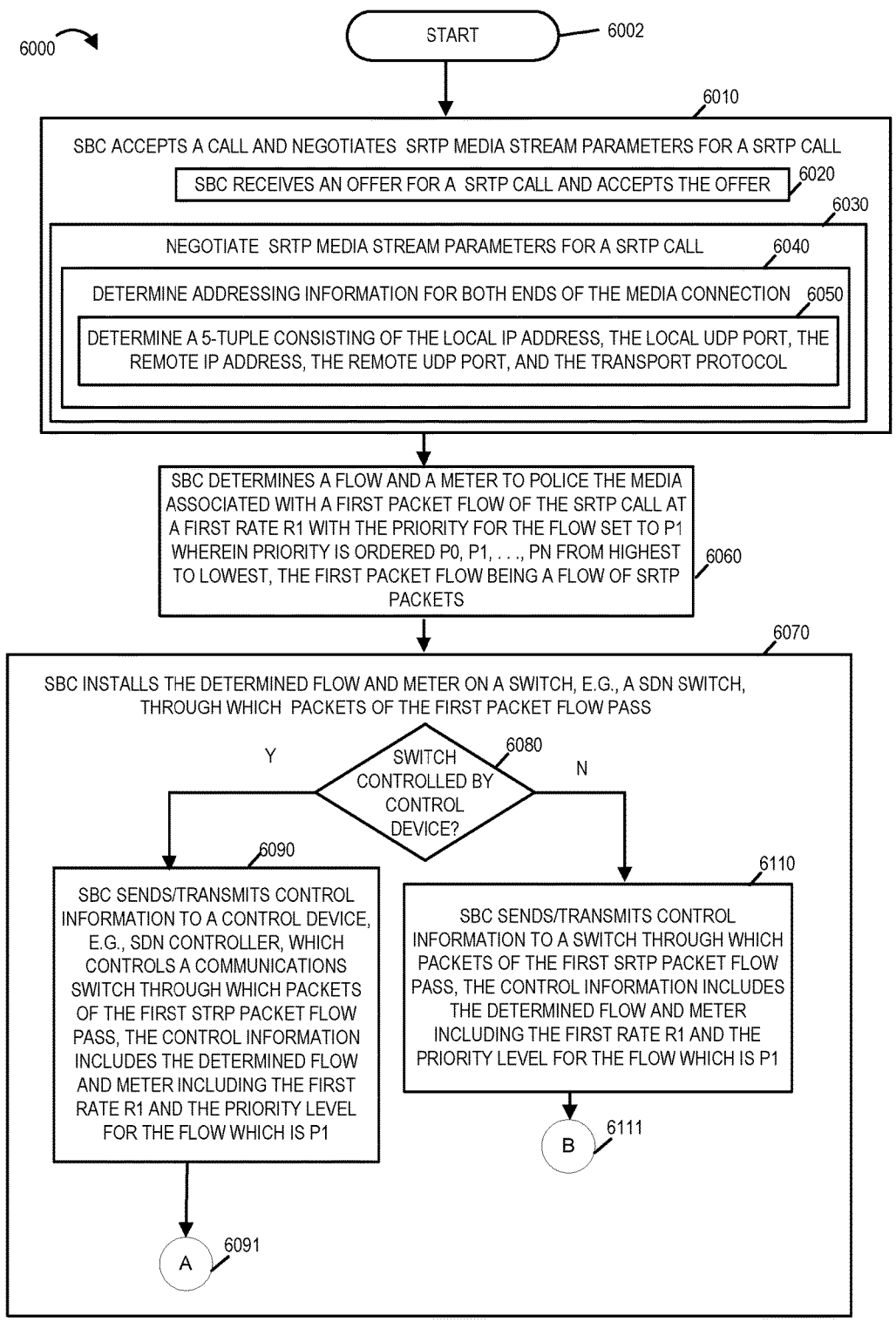
FIG. 6A illustrates a first part of a flowchart showing the steps of an exemplary communications method in accordance with one embodiment of the present invention.
Figures 6, 6A, 6B, 6C:
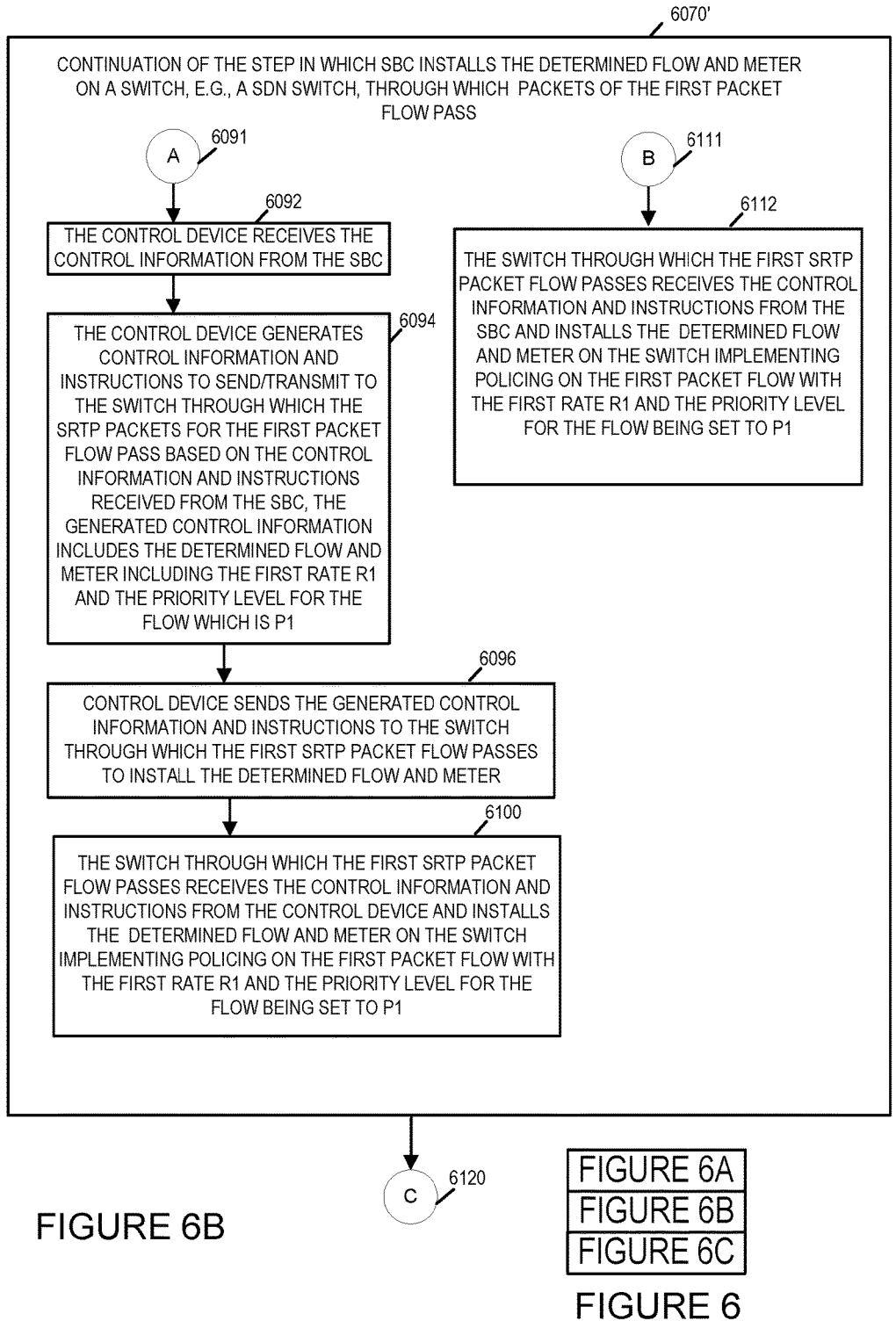
FIG. 6 illustrates the combination of FIGS. 6A, 6B and 6C.
FIG. 6B illustrates a second part of a flowchart showing the steps of the exemplary communications method in accordance with one embodiment of the present invention.
FIG. 6C illustrates a second part of a flowchart showing the steps of the exemplary communications method in accordance with one embodiment of the present invention.
Figure 6C:
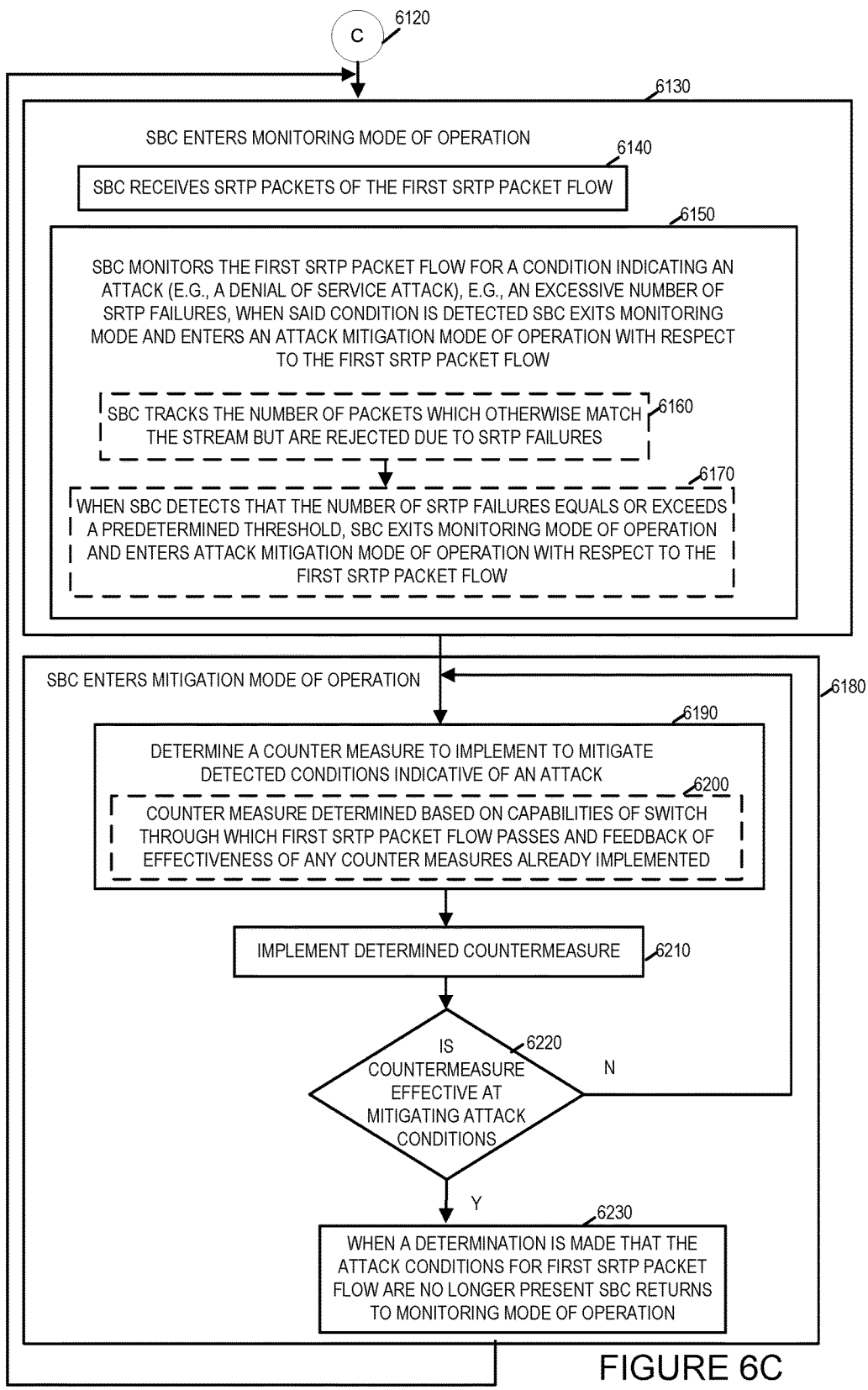

An exemplary method 6000 of operating a communications system for protecting a secure media stream will now be described. The exemplary method 6000 is illustrated in FIG. 6 which comprises a first part FIG. 6A, a second part FIG. 6B, and a third part FIG. 6C. In this exemplary embodiment, the exemplary secure media stream is a Secure Real-time Transport Protocol (SRTP) stream in which the media is for a VOIP call which will be referred to as a SRTP call. The exemplary system 100 of FIG. 1 will be used to describe the method 6000 but it should be appreciated that the method 6000 may be implemented on other systems. In this example, the first device 104 will be a SBC, the switches 101 and 102 will be OpenFlow switches, and the control device 106 will be an SDN controller.

The system 100 in this exemplary embodiment has two modes of operation. The first mode of operation is a monitoring mode of operation in which the system 100 monitors for conditions indicative of an attack such as for example a denial of service attack. The second mode of operation is an attack mitigation mode of operation in which the system 100 performs various operations to mitigate the effects of an attack. SBC 102 also has two modes of operation a monitoring mode of operation in which it monitors for conditions indicative of an attack such as for example a denial of service attack and an attack mitigation mode of operation in which it performs various operations including sending control information to either switch 102 or the SDN controller 106 which controls switch 102 to perform counter measures to mitigate the attack.

The method 6000 starts in start step 6002 and operation proceeds to step 6010. In step 6010, the SBC accepts a call offer and negotiates media stream parameters for the call. Step 6010 includes sub-steps 6020 and 6030. In step 6020, the SBC receives an offer for a call and accepts the offer. In this example, the call is a SRTP call including a SRTP media stream including a first SRTP packet flow. For explanatory purposes, the call offer in this example is from endpoint device 108 and is received via communications link 110, switch 101, and communication link 111. The accepted call offer may be, and in some embodiments is, a SIP INVITE message including a SDP offer message, for the first call. In some embodiments, part of accepting the call offer, is generating and sending a SIP message, e.g., a SIP 200 to the device that sent the offer in this example endpoint device 108 including a SDP answer message. The answer message is generated by and communicated from SBC 104 to the endpoint device 108 via communications link 111, switch 101 and communications link 110. Operation proceeds from step 6020 to step 6030.

In step 6030, the SBC 104 negotiates the SRTP media stream parameters for the SRTP call. These parameters include, among other things, the addressing information for both ends of the media connection and the SRTP context information. In some embodiments, the SDP answer includes parameters for establishing the SRTP media stream for the call which is part of the negotiation of the addressing information for the media connection for the call. Step 6030 includes sub-step 6040. In sub-step 6040, as part of the negotiation, the addressing information for both ends of the media connection for the call, the endpoint 108 and the SBC 104, is determined by the SBC. The sub-step 6040 may, and in some embodiments does, include a sub-step 6050. In sub-step 6050, the SBC determines a 5-TUPLE consisting of the local IP address, the local UDP port, the remote IP address, the remote UDP port, and the transport protocol to be used for the SRTP media stream. Operation proceeds from step 6010 to step 6060.

In step 6060, the SBC 104 determines a flow and a meter to police the media associated with a first packet flow of the SRTP call at a first rate R1 with a priority for the flow set to P1 wherein priority is ordered P0, P1, . . . , PN from highest to lowest, and P1 is the second from highest priority setting. The first packet flow is a flow of SRTP packets from the endpoint device 108 to the SBC 104. Operation proceeds from step 6060 to step 6070.

In step 6070, the SBC 104 installs the determined flow and meter on a switch, e.g., a SDN switch, through which the packets of the first packet flow pass. In this example, the packets of the first packet flow are transmitted from endpoint device 108 to the SBC 104 via switch 102 over communications links 118 and 120. The SBC 104 installs the flow meter on the switch 102. In some embodiments, the step 6070 includes sub-steps 6080, 6090, 6100 and 6110.

In sub-step 6080, the SBC 104 determines if the switch through which the first packet flow is to pass. If the switch is controlled by a separate control device operation proceeds from step 6080 to step 6090. If the switch is not controlled by a separate control device operation proceeds from step 6080 to step 6110. Systems 100 and 100A are exemplary systems that include a control device 106 which may, and in some embodiments is, used to control switch 102 through which the first packet flow passes. System 100B is an exemplary communications system which does not include a separate control device for controlling the switch 102 through which the first packet flow passes.

In sub-step 6090, the SBC 104 sends/transmits control information to the control device that controls the communications switch through which packets of the first STRP packet flow pass. The control information includes the determined flow and meter including the first rate R1 and the priority level for the flow which is P1. In the example of system 100 of FIG. 1, the control device 106 controls the switch 102 through which the SRTP packets of the first packet flow pass. The SBC 104 sends the control information for policing the first SRTP packet flow to the control device 106 via communications link 114. Operation proceeds from step 6090 via connection node 6091 to step 6092 illustrated on FIG. 6B in box 6070' which represents a continuation of step 6070 in which the SBC installs the determined flow and meter on a switch.

In step 6092, the control device 106 receives the control information and instructions from the SBC 104. Operation proceeds from step 6092 to step 6094.

In step 6094, the control device 106 generates control information and instructions to send/transmit to the switch through which the SRTP packets for the first packet flow pass based on the control information and instructions received from the SBC. The generated control instructions include instructions to the switch through which the first SRTP packet flow passes (switch 102) to install the determined flow and meter on the switch to implement policing on the first packet flow. Operation proceeds from step 6094 to step 6096.

In step 6096, the control device 106 sends instructions including control information to the switch 102 to install the determined flow and meter on the switch to implement policing on the first packet flow. The control device 106 communicates control information and instructions to the switch 102 via communications link 116. Operation proceeds from step 6096 to step 6100.

In step 6100, the switch through which the first SRTP packet flow passes which in this example is switch 102, receives the control information and instructions from the control device 106 over the communications link 116. The switch 102 upon receiving the control information and instructions installs the determined flow and meter on the switch to implement policing on the first packet flow with the first rate R1 and the priority level for the flow being set to P1. Once the determined flow and meter has been installed on the switch to implement policing of the first packet flow, operation proceeds from step 6070 via connection node C 6120 to step 6130 shown on FIG. 6C wherein the SBC enters a monitoring mode of operation which is discussed in further detail below.

Returning to sub-step 6080, when the SBC 104 determines in sub-step 6080 that the switch through which the first SRTP packet flow is to pass is not controlled by a separate controlling device such as for example in the system 100B of FIG. 1B the SBC 104 sends/transmits control instructions including the control information to the communications switch through which packets of the first STRP packet flow pass. The control information includes the determined flow and meter including the first rate R1 and the priority level for the flow which is P1. In this example, the control information would be exchanged between the SBC and switch 102 via communications link 112. In some embodiments, even when the switch through which the packets of the first packet flow are to pass is controlled by a separate control device, the SBC also acts as a controlling device for the switch and sends control instructions including control information directly to the switch instead of to a separate control device. In some such embodiments, the switch is configured to follow instructions received from either the control device or the SBC. In some embodiments, the switch is further configured to give control information and instructions received from the SBC higher priority than control information or instructions received from the separate control device. Operation proceeds from step 6110 via connection node B 6111 to step 6112 shown in box 6070' which represents a continuation of step 6070.

In step 6112, the switch 102 receives the control information and instructions from the SBC and upon receiving the control information and instructions installs the determined flow and meter on the switch to implement policing on the first packet flow. Once the determined flow and meter has been installed on the switch to implement policing of the first packet flow with the first rate R1 and the priority level for the flow being set to P1, operation proceeds from step 6070 via connection node C 6120 to step 6130 shown on FIG. 6C wherein the SBC enters a monitoring mode of operation which is discussed in further detail below.

Operation proceeds from step 6070 to step 6130 shown on FIG. 6C via connection node C 6120.

In step 6130, the SBC enters a monitoring mode of operation where the SBC monitors the first SRTP packet flow for a condition indicative of an attack, e.g., a denial of service attack. At a high level, when operating in monitoring mode the SBC keeps track of the number of packets which otherwise match the stream but are rejected due to SRTP failures. These can be failures of SRTP authentication, or unexpected SRTP SEQ numbering, or any other criterion that would typically cause a packet to not be included in an SRTP stream. When such failures reach or in some cases exceed a threshold, the SBC enters a mitigation mode of operation and activates one or more counter-measures. The threshold may be, and in some embodiments is, based on one or more of the following: rate of failures, duration of failures, or non-receipt of valid packets. The SBC monitoring mode of operation will now be explained in further detail with respect to the method 6000. Step 6130 in some embodiments includes sub-steps 6140 and 6150.

In sub-step 6140, the SBC receives SRTP packets of the first SRTP packet flow from the endpoint device 108 via the switch 102 over communications links 118 and 120. Operation proceeds from sub-step 6140 to sub-step 6150.

In sub-step 6150, the SBC monitors the first SRTP packet flow for a condition indicative of an attack, e.g., a denial of service attack, such as for example an excessive number of SRTP failures. When said condition indicative of an attack is detected, the SBC exits from the monitoring mode of operation and switches to an attack mitigation mode of operation with respect to the first SRTP packet flow.

In some embodiments sub-step 6150 includes sub-steps 6160 and 6170. In sub-step 6160, the SBC tracks the number of packets which otherwise match the first SRTP stream packet flow but are rejected due to SRTP failures such as those described above. Operation proceeds from sub-step 6160 to sub-step 6170.

In sub-step 6170, when the SBC detects that the number of SRTP failures for the first packet flow equals or exceeds a threshold such as a predetermined threshold, the SBC exits the monitoring mode of operation and enters or switches to an attack mitigation mode of operation with respect to the first SRTP packet flow. The threshold may be, and in some embodiments is, based on one or more of the following: rate of failures, duration of failures, or non-receipt of valid packets.

Operation proceeds from step 6130 to step 6180. In step 6180, the SBC enters or switches to a mitigation mode of operation in which the SBC activates and implements one or more counter measures. The mitigation mode of operation step 6180 includes sub-steps 6190, 6210, 6220, and 6230.

In sub-step 6190, the SBC determines the counter measure to implement to mitigate the detected conditions indicative of an attack. In some embodiments, the sub-step 6190 includes sub-step 6200. In sub-step 6200, the counter measure to be implemented is determined based on the capabilities of the switch through which the first SRTP packet flow passes. In some embodiments, the determination of the counter measure to be activated is also based on feedback of the effectiveness of any counter measures already implemented. Operation proceeds from sub-step 6200 to sub-step 6210. In sub-step 6210, the determined counter measure is implemented. Operation proceeds from sub-step 6210 to sub-step 6220. Exemplary countermeasure communications methods/routines 7000, 8000, and 9000 which may be, and in some embodiments are, implemented in step 6210 are illustrated in FIGS. 7, 8 and 9 respectively and are discussed in further detail below.

In sub-step 6220, a determination is made as to whether the counter measure implemented is effective at mitigating the detected attack conditions. If the determination is that the counter measure is not effective then operation proceeds to sub-step 6190 wherein a new determination is made as to which counter measure to implement taking into account the lack of effectiveness of the first counter measure implemented. The new counter measure may be to implement a different counter measure or an additional counter measure from a counter measure previously implemented. In some situations, the newly determined counter measure may be to implement the same counter measure currently being implemented. Such a situation may occur when the current counter measure has been determined to be best counter measure available or the most appropriate counter measure given the type of attack detected. Upon determining the counter measure in step 6200 as discussed above, processing proceeds as previously described in step 6210 wherein the counter measure is implemented. Once the counter measure is implemented in step 6210, a determination is once again made in sub-step 6220 as to whether the counter measure has been effective at mitigating the attack conditions. If the determination is no, the process repeats with operation proceeding to sub-step 6190.

In step 6220, when it is determined that the counter measure has been effective in mitigating the detected attack conditions processing proceeds from step 6220 to step 6230. In step 6230, when the SBC make the determination that the attack conditions for the first SRTP packet flow are no longer present the SBC returns to the monitoring mode of operation and operation proceeds from step 6230 to step 6130. Until the SBC makes the determination that the attack conditions for the first SRTP packet flow are no longer present the SBC continues to operate in the mitigation mode of operation during which time the SBC implements the mitigation counter measure(s).

Figure 7:
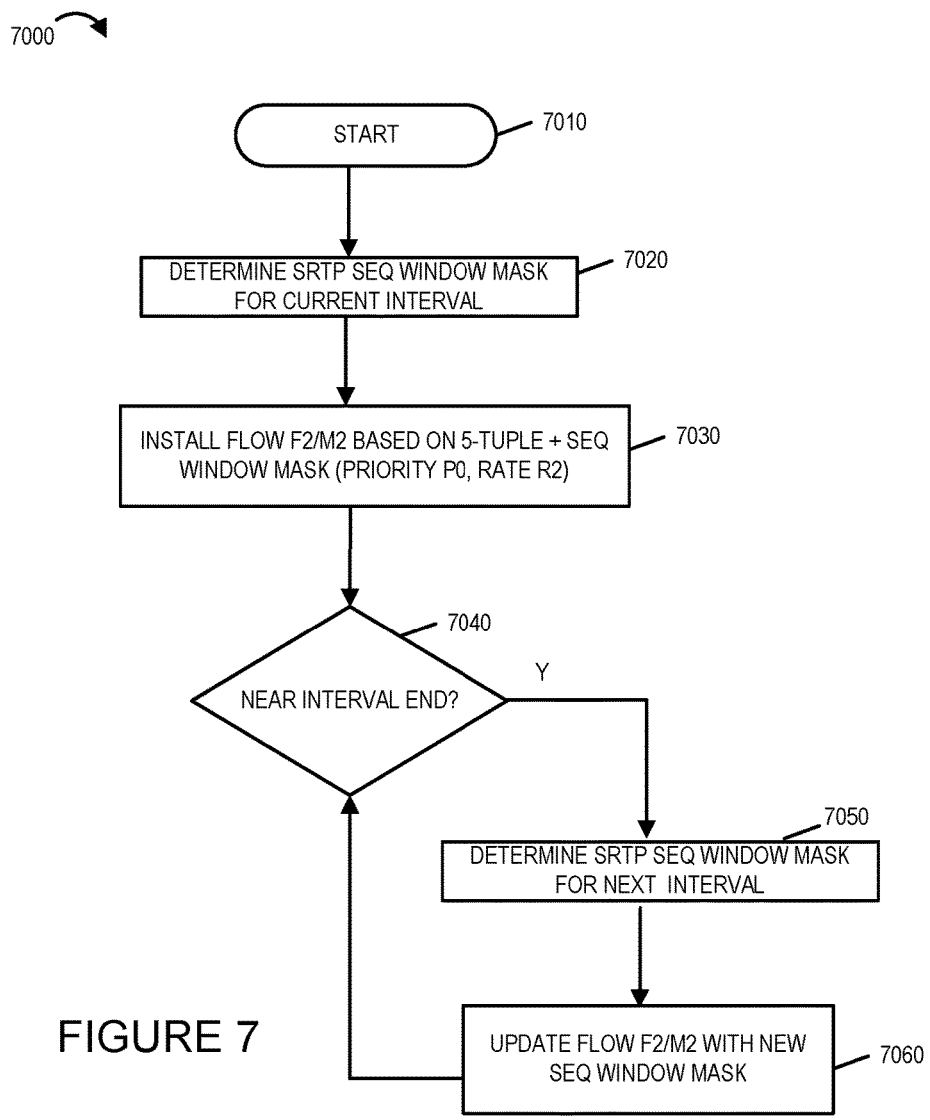
FIG. 7 illustrates a flowchart of an exemplary communications method using a SEQ number space filtering technique as a mitigation counter measure to an attack in accordance with an embodiment of the present invention
Figure 8:
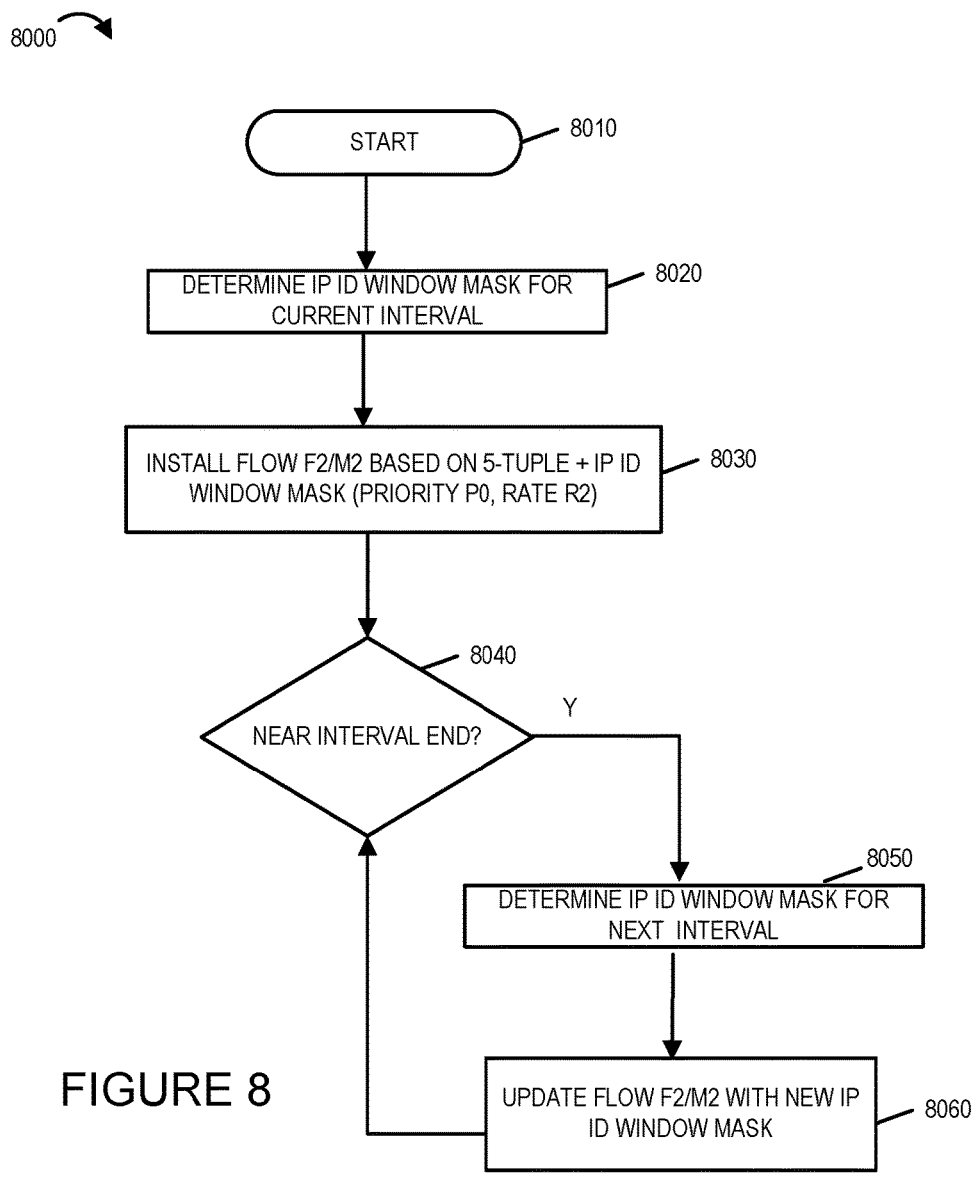
FIG. 8 illustrates a flowchart of an exemplary communications method using a IP ID field filtering technique as a mitigation counter measure to an attack in accordance with an embodiment of the present invention.
Figure 9:
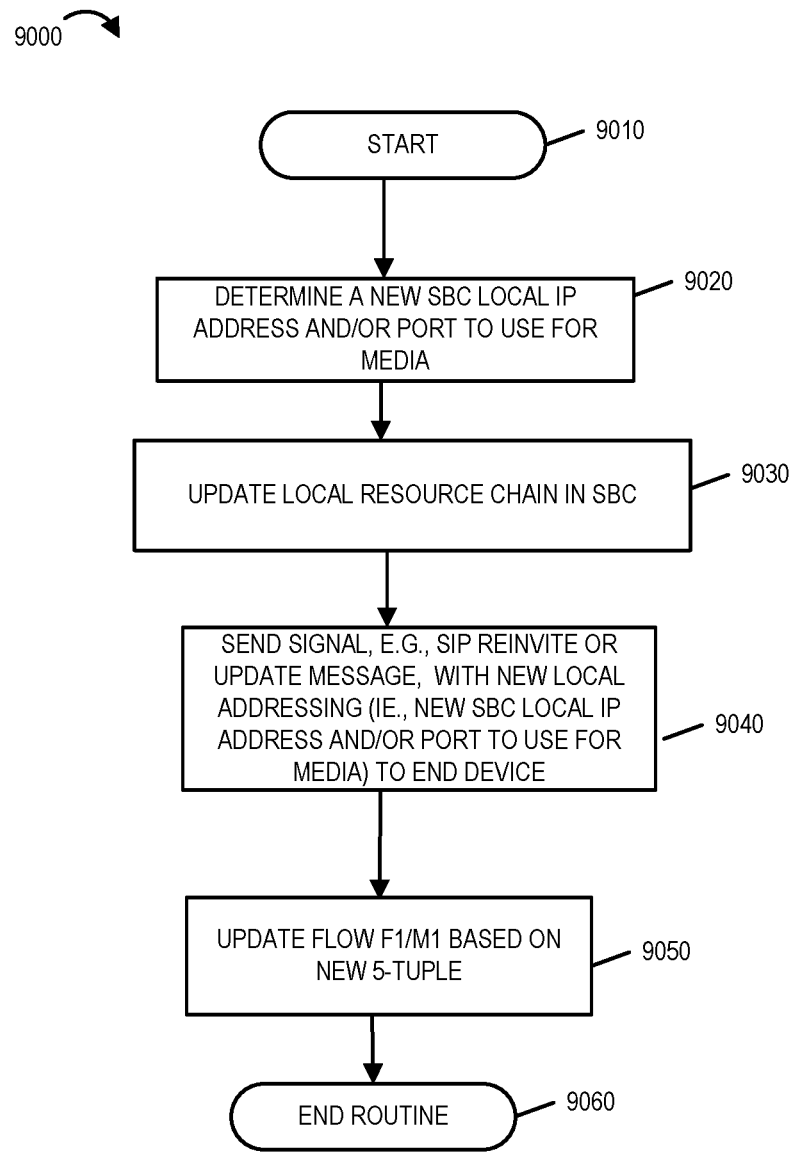
FIG. 9 illustrates an exemplary communications method using a 5-TUPLE matching technique as a mitigation counter measure to an attack in accordance with an embodiment of the present invention.

FIGS. 7, 8 and 9 illustrate three different counter measures which may be, and in some embodiments are, implemented to mitigate the conditions indicative of an attack such as blind or static denial of service attack. An exemplary method embodiment using a SEQ space filtering technique as a mitigation counter measure is shown in FIG. 7. FIG. 8 illustrates another exemplary method embodiment using an IP ID field filtering technique as a mitigation counter measure. FIG. 9 illustrates an additional exemplary method embodiment using a 5-TUPLE matching technique in the switch through which the SRTP packets are passing as a mitigation counter measure. While the exemplary method 6000 shows a single counter measure being determined to be implemented at a time, in some embodiments multiple counter measures are determined to be implemented at the same time. In some embodiments, a single counter measure is implemented first. If the counter measure is not successful one or more different counter measures are implemented in place of or in addition to the first counter measure implemented/activated. For example, the first counter measure may be, and in some embodiments is, the method 7000 of FIG. 7 and if that counter measure is not effective in achieving the desired level of mitigation, the method 8000 of FIG. 8 is implemented in place of method 7000. If the method 8000 is not effective in achieving the desired level of mitigation then the method 9000 of FIG. 9 is implemented in place of the method 8000 of FIG. 8. By further way of example and not limitation, the first counter measure may be counter measure 7000 and if it is not deemed successful at mitigating the conditions of an attack, the counter measure method 9000 of FIG. 9 may be implemented in addition to the method 7000. Any sequence or combination of counter measures may be implemented to mitigate the conditions of the attack.

As discussed in connection with FIGS. 7, 8 and 9 there are several variants of the counter measures that may be implemented during the mitigation mode of operation. A first exemplary variant is based on SRTP SEQ number filtering and a flowchart of the method 7000 is shown in FIG. 7.

The SEQ number is used by SRTP to implement a sequence window for replay detection. This is typically used by setting the right edge of the window to be the sequence number next expected. Then, an arriving packet that is behind this sequence number but within the window and already marked as received is considered a replay, which can be summarily rejected. In method 7000, the window covers a slice of the receive sequence space that includes not just recent past but also the near future. For example, if the next expected SEQ is 50100, this new window might be the slice (50090, 50110). As with the replay window, this new window also slides as new packets arrive and time moves on such that it always covers the slice of the sequence number space expected in the recent past and the near future. Implementing a sliding window is problematic and difficult to implement in the arrangement described here. However, consider the following approximation. Suppose a sliding window to cover the sequence space slice (50090, 50110) as before is wanted. Switching to hexadecimal notation, the desired window is (C3AA, C3BE). A mask of C3A0 will cover the window by (C3A0, C3BF) which is (50080, 50111) in decimal. Hence, a mask can be used to approximate an arbitrary window by rounding up the window size to the next power of 2. Now consider an approximation to the sliding of the window. Suppose that the desired window is intended to a packet stream at a rate of 1 packet every 20 milliseconds (ms). Consider a mask sequence (C380, C3CO, C400, C480, . . . ) with each mask covering 64 packets that is advanced every 1.28 seconds (s). By timing the moves to roughly coincide with the middle of the interval ensures that the mask sequence will always cover the desired sliding window. Also note that the timing requirements of the mask updates can be tuned at the expense of the tightness of the fit. For example, by using a mask sequence (C300, C400, C500), the mask only needs to be updated every 2.56 s and so on.

Turning now to the flowchart illustrating the method 7000 of FIG. 7, the method starts with start step 7010. Operation then proceeds from step 7010 to step 7020. In step 7020, the SBC determines the SRTP SEQ number mask that covers the current interval. The size of the mask, i.e., the number of bits with exact match versus wildcard, is determined by the desired rate of updates. Also determined is the new flow and meter. The priority of this new flow is P0 (i.e., a higher priority than the F1/M1 flow meter previously installed at the switch 102 through which the SRTP first packet flow passes). The rate of the new flow is R2. Operation proceeds from step 7020 to step 7030.

In step 7030, the new flow and meter F2/M2 is installed with a match for the 5-tuple addressing and the determined mask by the SBC at the switch 102 through which packets of the first SRTP packet flow passes. Operation proceeds from step 7030 to step 7040.

In steps 7040, 7050 and 7060, as time (and the expected packet SEQ slice) advances, the SEQ mask is updated to cover the upcoming sliding window. Since in this example, the mask covers at least twice the size of the desired sliding window, it is always possible to time the mask updates in a manner that ensures the desired sliding window is always fully covered.

In step 7040, a determination is made if the end of the interval is near, and when the determination is yes operation proceeds from step 7040 to step 7050.

In step 7050 the SBC determines a SRTP SEQ window mask for the next interval. Operation then proceeds to step 7060 where the switch 102 through which packets of the first SRTP packet flow pass is updated. In some embodiments, the switch 102 is updated by the SRTP SEQ window mask being sent or transmitted from the SBC to a control device, e.g., a SDN controller, which transmits control instructions and the determined mask to the switch, the control instructions instructing the switch to update the switch to implement policing of the first SRTP packet flow using the determined mask. In some embodiments, the switch through which the packets of the first SRTP packet flow pass is updated by the SBC sending control instructions and the determined SRTP SEQ window mask directly to the switch through which the packets of the first SRTP packet flow passes. This may be done for example in systems such as the system 100B shown in FIG. 1B which does not include a separate control device for controlling the switch through which the packets of the first SRTP packet flow passes. In some embodiments, the SBC does not determine the SRTP SEQ window mask for the next interval but instead sends information to either a control device or the switch through which the packets of the first SRTP packet flow pass from which the mask is generated by either the control device or the switch.

The policing rates for the M1 and M2 meters are set based on the expected normal case behavior. A normal SRTP media flow should always match both the F1 and F2 flow. However, since F2 has a higher priority, that flow and the M2 meter will be used. Consequently, the M2 meter should be set based on the expected packet rate as determined by the codec negotiation. Typically, this is programmed with some additional slack. However, F1/M1 is still used because there are situations where the SEQ number space can legitimately change, for example, due to rekeying. However, these events are rare and in some embodiments, it is possible to use a lower fill rate since the burst parameters may cover the period it takes the SBC to update the other flow. Even if the same policing rates are used for the M1 and M2, the maximum rate reaching the SBC is double the expected rate but is still a bounded rate.

The load on the SBC under different usage scenarios will now be discussed. For the normal use case where there is no attack traffic and the SBC has validly behaving peers, the SBC will still receive the expected packet rate. The additional overhead on the SBC is the cost of updating the flows in the switch. Given that this can be achieved on the order of seconds, this additional load is immaterial. Next consider the situation of a completely blind attacker. In the situation of a completely blind attacker, it is unlikely that the attack packets will match the exact 5-tuple used for addressing in F1 and F2, and, hence, all the attack packets will be dropped by the switch and the SBC will not see any additional load. Next consider the case when the attacker is not blind but is able to capture a packet from the valid stream and to replay the packet and presume the replay is at a very high rate. If the SBC flow SEQ mask update interval is chosen to be 3 seconds, then the replay attack doesn't cause extra load on the SBC as the number of packets reaching the SBC is still the expected packet rate; however, the attack packets could squeeze out the legitimate packets of the packet stream. The SBC will then detect the problem and install the secondary flow that filters by SEQ space. However, even with this secondary flow, it is possible that the attack packets can make it through initially because the mask to allow valid packets may still allow the replay packets. However, this disruption can only last at most 6 seconds. To see this, suppose the attacker got very lucky and captured a valid packet at time t0=0 when that SEQ was at the absolute forward edge of the window. Further, suppose that the attacker is able to then immediately start replaying that packet with no delay. At time t1=3 seconds, the SBC will advance the mask. However, there will be an overlap so the attack packets would still be allowed by this new mask. But at time t2=6 seconds, the SBC will advance the mask again. Now, the attack packets will fall outside the mask and the switch will start discarding all the attack packets. This is the worst case. In the average case, the captured packet will be midway in the window, and the attack stream will be thwarted after the single window move.

The exemplary first counter measure variant uses the SRTP SEQ number matching for the additional flow validation. However some switches may not be able to match on packet contents beyond the IP and/or UDP header. The IPv4 ID field is defined in Internet Engineering Task Force Request for Comment (RFC) 1122 and updated in RFC 6864. The IPv4 ID field is used in assisting the reassembly of fragmented IP packets. Though the RFC requirements only indicate that it must be unique within the maximum datagram lifetime (MDL) for a given source address, destination address, and protocol 3-tuple, the vast majority of implementations use a simple monotonically increasing sequence number. Note however that some implementations use the same sequence space for all IP packets, not per 3-tuple. Given this it is possible to approximate the previously described behavior using the IPv4 ID filed. The IPv6 also has a similar field. Some care must be given, however, to the possibility that this ID will increase by more than one for each packet in the SRTP stream. The second exemplary variant counter measure variant is based on the use of IP ID field filtering.

The second exemplary counter measure variant is illustrated in the flowchart of the method 8000 shown in FIG. 8 and is similar to the first counter measure but uses the IP ID field for filtering instead of the SRTP SEQ number field. The attack counter measure method 8000 starts with start step 8010. Operation then proceeds from step 8010 to step 8020. In step 8020, the SBC determines the IP ID window mask that covers the current interval. The size of the mask, i.e., the number of bits with exact match versus wildcard, is determined by the desired rate of updates as previously explained. Also determined is the new flow and meter. The priority of this new flow is P0 (i.e., a higher priority than the F1/M1 flow meter previously installed at the switch 102 through which the SRTP first packet flow passes). The rate of the new flow is R2. Operation proceeds from step 8020 to step 8030.

In step 8030, the new flow and meter F2/M2 is installed with a match for the 5-tuple addressing and the determined mask by the SBC at the switch 102 through which packets of the first SRTP packet flow passes. Operation proceeds from step 8030 to step 8040.

In steps 8040, 8050 and 8060, as time (and the expected packet IP ID slice) advances, the IP ID mask is updated to cover the upcoming sliding window. Since in this example, the mask covers at least twice the size of the desired sliding window, it is always possible to time the mask updates in a manner that ensures the desired sliding window is always fully covered.

In step 8040, a determination is made if the received packet is near the end of the interval, and when the determination is yes operation proceeds from step 8040 to step 8050.

In step 8050 the SBC determines, an IP ID window mask for the next interval. Operation then proceeds to step 8060 where the switch 102 through which packets of the first SRTP packet flow pass is updated.

In some embodiments, the switch 102 is updated by the SRTP SEQ window mask being sent or transmitted from the SBC to a control device, e.g., a SDN controller, which transmits control instructions and the determined mask to the switch, the control instructions instructing the switch to update the switch to implement policing of the first SRTP packet flow using the determined mask. In some embodiments, the switch through which the packets of the first SRTP packet flow pass is updated by the SBC sending control instructions and the determined IP ID window mask directly to the switch through which the packets of the first SRTP packet flow passes. This may be done for example in systems such as the system 100B shown in FIG. 1B which does not include a separate control device for controlling the switch through which the packets of the first SRTP packet flow passes. In some embodiments, the SBC does not determine the IP ID window mask for the next interval but instead sends information to either a control device or the switch through which the packet flow passes from which the mask is generated by either the control device or the switch.

A third exemplary counter measure variant is illustrated in the flowchart shown in FIG. 9. In method 9000 of FIG. 9, only a 5-tuple matching is used in the switch. The mitigation occurs by changing the local media IP address and/or local port through a signal to the remote user endpoint such as a reINVITE or UPDATE, and then changing the 5-tuple flow in the switch. The steps of the counter measure upon a detection of an attack in accordance with the method 9000 are now described in connection with the flowchart of FIG. 9. It should be noted that this third exemplary counter measure is typically useful for switches that can only match on the IP and TCP/UDP header. While this third counter measure requires external signaling to the peer (e.g., remote device, i.e. user endpoint), so that the peer is not totally unaware of the attack, the third counter measure has the advantage that it uses minimal capabilities in the switching infrastructure. Additionally, this third counter measure in most instance results in a shorter disruption of the valid stream since the attack stream is immediately stopped upon the update of the flow 5-tuple match.

The 5-tuple change counter measure method 9000 begins in step 9010. Operation proceeds from step 9010 to step 9020. In step 9020, the SBC 104 determines a new SBC local IP address and/or port to use for the SRTP media packet flow. Operation proceeds from step 9020 to step 9030. In step 9030, the SBC updates the local resource chain in the SBC such as for example resources that perform processing of the received media. Operation proceeds from step 9030 to step 9040. In step 9040, the SBC sends a signal, e.g., a SIP Re-Invite or Update message, with new local addressing information (i.e., new SBC local IP address and/or port to use for the SRTP media packet flow of the call) to the endpoint device 108. Operation proceeds from step 9040 to step 9050. In step 9050, the SBC updates the flow F1/M1 based on the new 5-tuple at the switch 102. Operation proceeds from step 9050 to step 9060 which is the end of the routine or method 9000. In some embodiments, the SBC 104 also determines as part of this routine that the attack has been successfully mitigated resulting in the SBC switching back to or re-entering monitoring mode with respect to this SRTP media packet flow.

In some embodiments, one attack mitigation counter measure is initially implemented upon the SBC entering the attack mitigation mode of operation and if the attack mitigation counter measure is determined to not be successful a different and/or additional attack counter measure is implemented. In some embodiments, the number and type of attack mitigation counter measures to be implemented is determined by the SBC upon entering the mitigation mode of operation. In some embodiments, one or more of the attack counter measures are implemented based on the capabilities of the switch through which packets of the packet flow pass.

In most, but not all embodiments, when the SBC determines that an attack mitigation counter measure has been successful in mitigating the conditions indicative of an attack then the SBC will switch back to the monitoring mode of operation. In some embodiments, the SBC will not switch back to the monitoring mode of operation until after a determination has been made that the conditions indicative of an attack have not been present for a predetermined period of time. In some embodiments, the predetermined period of time is configurable.

By implementing any of the foregoing attack mitigation counter measures, a static or blind attack stream will be successful countered. With any of the above described attack mitigation counter measures, a successful continuous attack would require a dynamic attack stream. The attacker must have access to the valid stream in order to copy valid content. Then the attacker must be able to spoof all portions of the addressing. Finally, the attacker must be able to regularly update the attack stream in a manner to mimic a valid stream. While attacks are still possible, it is clearly a more difficult endeavor. In contrast to the original attack face that is vulnerable to readily available capture and replay tools which can be used by relatively inexperienced script users, the new attack face implementing one or more of the attack mitigation counter measures will require code specifically written to copy a starting point and mimic a SRTP stream.

While the aforementioned embodiments have been described for SRTP, the invention is also applicable to other protocols. For example, the SEQ number filtering mitigation counter measure employed for SRTP is also applicable to systems that include a receiving device such as an SBC that is able to distinguish invalid packets and in which the sequence number field of the encryption protocol employed is in the clear (i.e., available without doing the decryption). Additional confidential protocols such as Secure Real-time Transport Control Protocol (SRTCP), Transport Layer Security (TLS) protocol, Internet Protocol Security (IPsec) protocol, and Secure Sockets Layer (SSL) protocol all have these features and, hence this technique is also applicable to such secured streams.

The present invention may also be used on other protocols/domains as well. For example, with Real-time Transport Protocol (RTP), the excess arrival rate of packets or rate of received missequenced packets for a media stream may, and in some embodiments is, used as an indicator of an attack. The point is that the application in question has the ability to detect anomalies in the received stream and determine that an attack is launched with a reasonable degree of certainty.

Sometimes a packet may be received outside of the current legitimate window for non-malicious reasons as well. For example, this could happen if a packet is retransmitted or delayed in the network or a second copy is sent for redundancy purposes. It is desirable not to drop such packets. To accommodate this need, an optional "rate of offense" policer may, and in some embodiments is, utilized. This policer acts only on packets, which initially are selected to be dropped as they fall outside of the allowed window range. A packet is actually dropped only if the rate of offending packets exceed a configured threshold.

In some embodiments, an optional optimization to reduce the rate of window updates (or eliminate them altogether) is employed by the switch (e.g., OpenFlow switch) sliding the window range itself. In some such embodiments, the switch is communicated the expected packet arrival rate from either the SBC or a control device controlling the switch or by the switch monitoring the current packet rate and sliding the window range accordingly.

In some embodiments, the switch, which may be an SDN device such as an OpenFlow switch, may determine offending methods by other means as well. For example, missequenced packets can be used for this purpose. If the rate of missequenced packets exceeds a configured threshold, further missequenced packets can be dropped as they would be considered as injected by an attacker.

In some embodiments, the switch would also be in a mode of dropping offending packets without an explicit notification by the first device (e.g., SBC) for all streams. In some embodiments, the first device does not have a monitoring mode of operation and an attack mitigation mode of operation but simply operates using only the attack mode of operation.

Figure 11A:
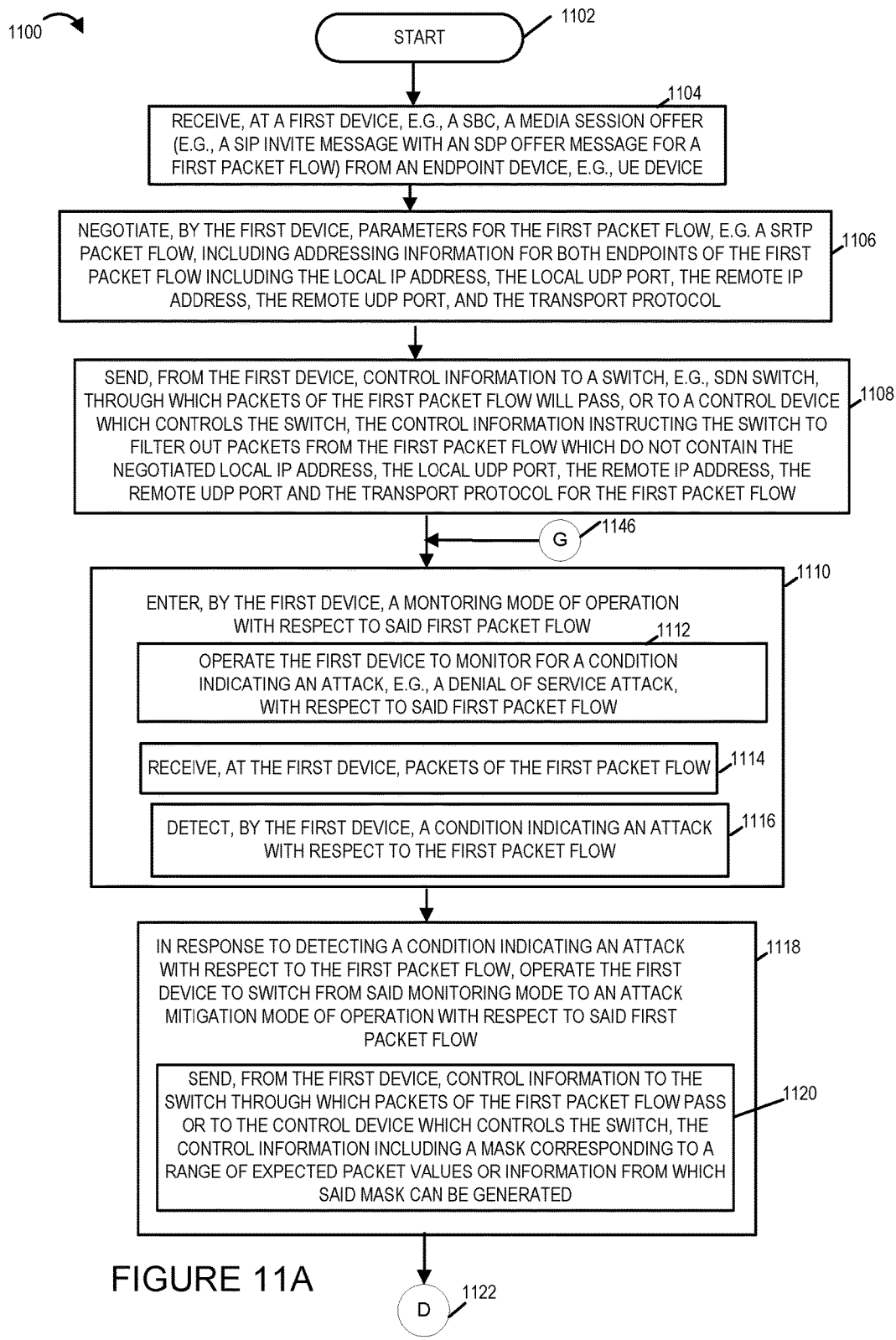
FIG. 11A illustrates a first part of a flowchart showing the steps of an exemplary communications method in accordance with one embodiment of the present invention.
Figure 11B:
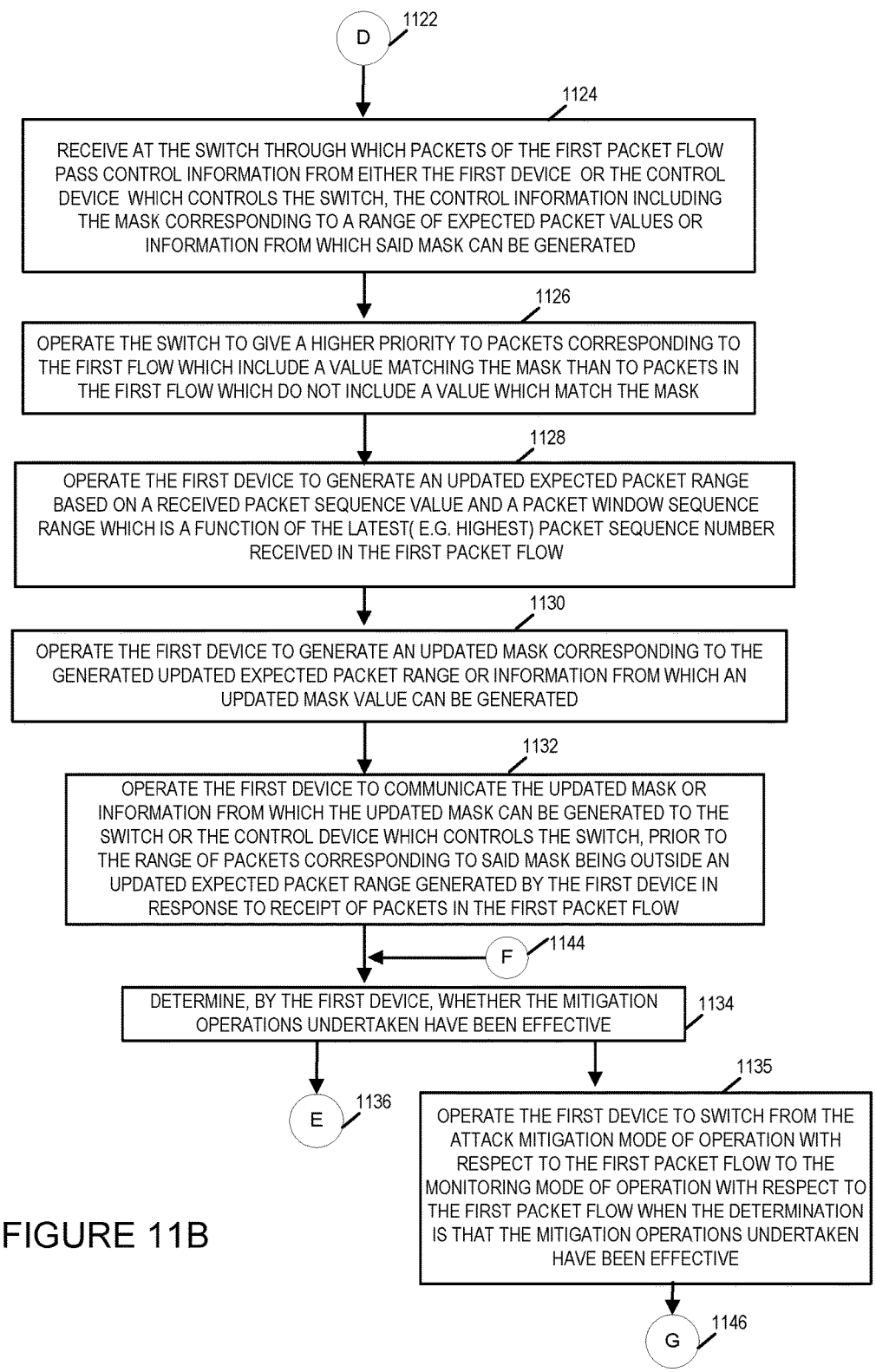
FIG. 11B illustrates a second part of a flowchart showing the steps of the exemplary communications method in accordance with one embodiment of the present invention.
Figures 11, 11A, 11B, 11C:
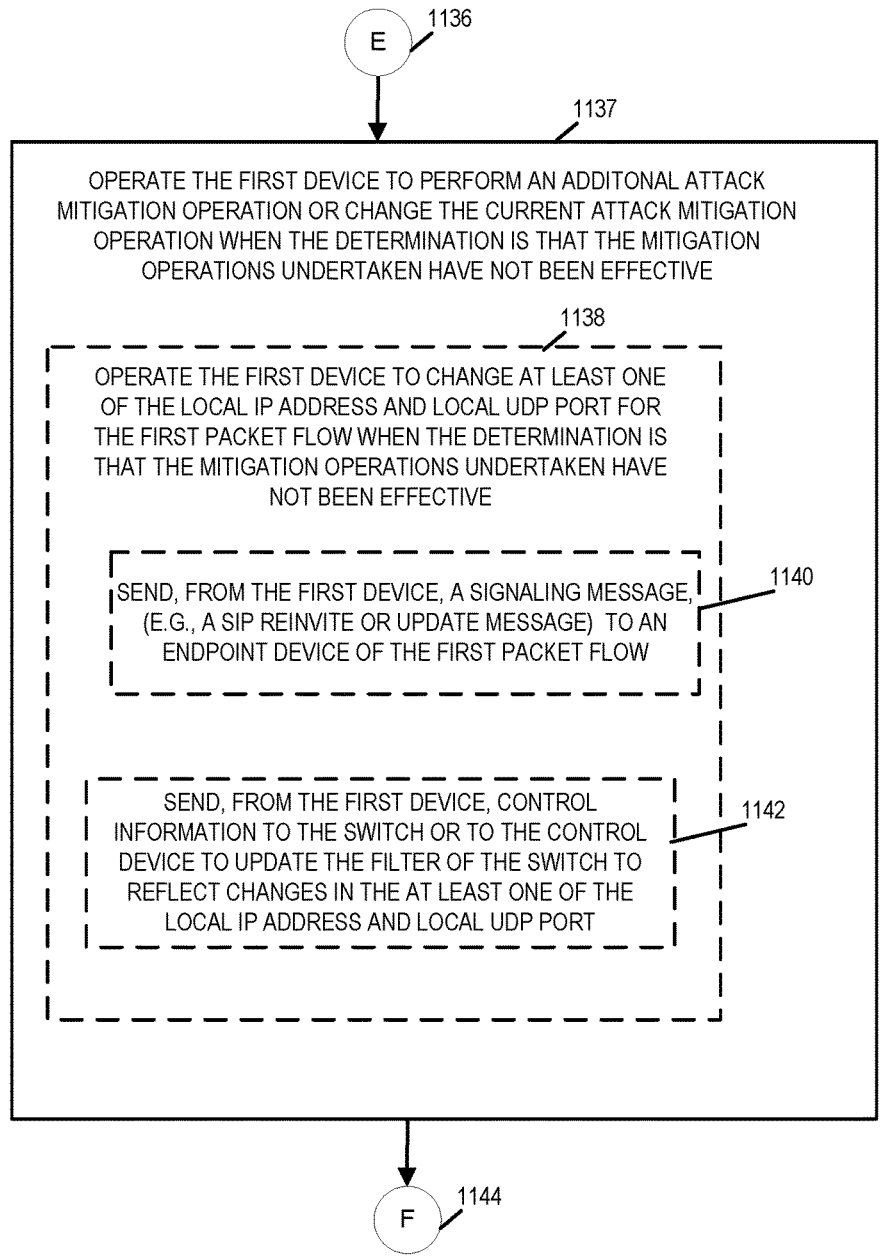
FIG. 11 illustrates the combination of FIGS. 11A, 11B and 11C.
FIG. 11C illustrates a second part of a flowchart showing the steps of the exemplary communications method in accordance with one embodiment of the present invention.

FIG. 11 illustrates the combination of FIGS. 11A, 11B and 11C. FIG. 11A illustrates a first part of a flowchart showing the steps of an exemplary communications method in accordance with one embodiment of the present invention. FIG. 11B illustrates a second part of a flowchart showing the steps of the exemplary communications method in accordance with one embodiment of the present invention. FIG. 11C illustrates a second part of a flowchart showing the steps of the exemplary communications method in accordance with one embodiment of the present invention. The method 1100 illustrated in FIG. 11 may be implemented on variety of different networks and systems. For explanatory purposes, the exemplary method 1100 will now be explained in connection with the exemplary system 100 of FIG. 1.

The method 1100 begins in start step 1102. Operation proceeds from start step 1102 to step 1104.

In step 1104, a first device 104 receives a media session offer, e.g., a SIP Invite message including an SDP offer message for a first packet flow from an endpoint device, e.g., UE 1 108. The SIP Invite message may be, and in some embodiments is, received at the first device 104 from endpoint 108 via communications link 110, switch 101 and communications link 111. Operation proceeds from step 1104 to step 1106.

In step 1106, the first device 104 negotiates parameters for the first packet flow, e.g., a Secure Real-time Transport Protocol (SRTP) packet flow, including addressing information for both endpoints of the first packet flow including the local IP address, the local UDP port, the remote IP address, the remote UDP port, and the transport protocol. Operation proceeds from step 1106 to step 1108.

In step 1108, the first device 104 sends control information to a switch 102, e.g., a SDN switch, through which packets of the first packet flow will pass, or to a control device 106, e.g., SDN controller, which controls the switch. The control information instructs the switch to filter out packets from the first packet flow which do not contain the negotiated local IP address, the local UDP port, the remote IP address, the remote UDP port and the transport protocol for the first packet flow. Operation proceeds from step 1108 to step 1110.

In step 1110, the first device enters a monitoring mode of operation with respect to the first packet flow. Step 1110 includes sub-steps 1112, 1114, and 1116. In sub-step 1112, the first device is operated to monitor for a condition indicating an attack, e.g., a denial of service attack, with respect to the first packet flow. In sub-step 1114, packets of the first packet flow are received at the first device. In sub-step 1116, the first device detects a condition indicating an attack with respect to the first packet flow.

Operation proceeds from step 1110 to step 1118 when the first device detects a condition indication an attack with respect to the first packet flow. In step 1118, in response to detecting a condition indicating an attack with respect to the first packet flow, the first device 104 is operated to switch from the monitoring mode of operation to an attack mitigation mode of operation with respect to the first packet flow. Step 1118 includes sub-step 1120.

In sub-step 1120, the first device 104 sends or transmits from the first device to the switch 102 through which packets of the first packet flow pass or to the control device 106 which controls the switch 102, control information including a mask corresponding to a range of information from which the mask can be generated. In some embodiments, the mask is generated by the first device. In some embodiments, information from which the mask can be generated is generated by the first device and is sent to the control device or directly to the switch. In such embodiments, the switch through which the packet of the first packet flow pass generates the mask. Operation proceeds from step 1120 via connection node 1122 to step 1124 shown on FIG. 11B.

In step 1124, the switch 102 through which packets of the first packet flow pass receives control information from either the first device 104 or the control device 106 which controls the switch 102. The received control information includes the mask corresponding to a range of expected packet values or the information from which the mask can be generated. In those embodiments in which the switch 102 receives control information from which the mask can be generated, the switch 102 generates the mask. Operation proceeds from step 1124 to step 1126.

In step 1126, the switch 102 is operated to give a higher priority to packets corresponding to the first flow which include a value matching the mask than to packets in the first flow which do not include a value which match the mask. Operation proceeds from step 1126 to step 1128.

In step 1128, the first device operates to generate an updated expected range based on a received packet sequence value and a packet window sequence range which is a function of the latest, e.g., highest, packet sequence number received in the first packet flow. Operation proceeds from step 1128 to step 1130.

In step 1130, the first device is operated to generate an updated mask corresponding to the generated updated expected packet range or information from which an updated mask value can be generated. Operation proceeds from step 1130 to step 1132.

In step 1132, the first device is operated to communicate the updated mask or information from which the updated mask can be generated to the switch 102 or the control device 106 which controls the switch prior to the range of packets corresponding to the mask being outside an updated expected packet range generated by the first device in response to the first packet flow. In those embodiments, in which the information from which the updated mask can be generated is communicated, the switch 102 generates the updated mask. The switch 102 upon receiving the updated mask or the information from which the updated mask can be generated from the first device 104 or the control device 106 uses the updated mask in place of the previous mask provided to implement policing of the packet stream as an attack mitigation counter measure operation.

Operation proceeds from step 1132 to step 1134. In step 1134, the first device determines whether the mitigation operations undertaken have been effective. Operation proceeds from step 1134 to step 1137 shown on FIG. 11C via connection node E 1136 when the determination by the first device is that the mitigation operations undertaken have not been effective. In some embodiments, the determination is made after a predetermined period of time. In some embodiments, the determination is made after a predetermined number of packets from the first packet flow have been received by the first device.

In step 1137, the first device 104 is operated to perform an additional attack mitigation operation or to change the current attack mitigation operation when the determination is that the mitigation operations undertaken have not been effective. In some embodiments step 1137 includes sub-step 1138. In sub-step 1138, the first device is operated to change at least one of the local IP address and local UDP port for the first packet flow when the determination is that the mitigation operations undertaken have not been effective. The local IP address and local UDP port being the address and port of the first device 104 being used for the first packet flow. In some embodiments, the sub-step 1138 includes one or more sub-steps 1140 and 1142. In sub-step 1140, the first device 104 sends from the first device a signaling message, e.g., a SIP reINVITE or UPDATE message, to an endpoint device 108 of the first packet flow. For example, the signaling message may be communicated from the first device 104 via the switch 101 over communications links 111 and 110. In sub-step 1142 the first device sends control information to the switch 102 through which the packets of the first packet flow pass or to the control device 106 that controls the switch 102 through which the packets of the first packet flow pass. The control information includes information and instructions to update the filter of the switch 102 through which the packets of the first packet flow pass to reflect changes in the at least one of the local IP address and local UDP port. Operation proceeds from step 1137 to determination step 1134 shown on FIG. 11B via connection node F 1144 where the first device determines whether the mitigation operations undertaken have been effective and the method continues as previously described.

When in step 1134 it is determined that the mitigation operations undertaken have been effective, operation proceeds from step 1134 to step 1135. In step 1135, the first device is operated to switch from the attack mitigation mode of operation with respect to the first packet flow back to the monitoring mode of operation with respect to the first packet flow. Operation proceeds from step 1135 via connection node G 1146 to step 1110 shown on FIG. 11A where the first device enters a monitoring mode of operation with respect to the first packet flow and the method continues on as previously described.

In some embodiments of the method 1100, the first packet flow includes encrypted packets and step 1112 of operating the first device to monitor for a condition indicating an attack includes operating the first device to perform a decryption operation on the received encrypted packets and determining that there is an attack when the first device is unable to successfully decrypt a larger than expected portion of the received packets. In some such embodiments of the method 1100, the sequence number of the encrypted packets is transmitted in the clear that is without being encrypted.

In some embodiments of the method 1100, the sequence numbers are packet sequence numbers or Internet Protocol version 4 identification numbers (IPv4 ID field) or Internet Protocol version 6 identification numbers (IPv6 ID field).

In some embodiments of the method 1100, the first packet flow is a flow of Secure Real-Time Transport Protocol packets and the packet sequence numbers are Secure Real-Time Transport Protocol packet sequence numbers.

In some embodiments of the method 1100, the first device is a Session Border Controller. In some embodiments of the method 1100, the switch through which the packets of the first packet flow pass is an OpenFlow switch such as for example a switch including OpenFlow 1.4+ capabilities. In some embodiments, the control device is a Software Defined Network Controller such as for example an OpenFlow SDN Controller including functions to control OpenFlow switches such as OpenFlow 1.4+ switches.

In some embodiments in which the first device sends or communicates control information and/or instructions to the control device which controls the switch through which the packets of the first packet flow pass, the control device either forwards the control information and/or instructions to the switch or generates control information and/or instructions based on the received control information and/or instructions and sends the generated control information and/or instructions to the switch. In some embodiments, the control device generates the mask or the updated mask from the information provided by the first device and sends the switch through which packets of the first packet flow pass the mask. In other embodiments, the control device sends either the mask or updated mask received to the switch or the control information from which the mask or updated mask can be generated.

Additional exemplary embodiments and various aspects and features of the exemplary embodiments will now be described. In an exemplary communications system in accordance with the present invention, the communications system includes a first device, e.g., a SBC. The first device includes: an Input/Output interface for receiving packets of a first packet flow and sending control information to a switch (e.g., an SDN switch if network in which the switch is located is an SDN network) through which packets of the first packet flow pass or to a control device (e.g., SDN controller) which controls the switch, the control information including a mask corresponding to a range of expected packet values. In some but not all embodiments, the first device further includes a processor, the processor being configured to control the first device to monitor for a condition indicating an attack (e.g., denial of service attack) with respect to the first packet flow when the first device is in a monitoring mode of operation with respect to the first packet flow. In some embodiments, the processor of the first device is further configured to control the first device to switch in response to detecting a condition indicating an attack with respect to the first packet flow from the monitoring mode of operation to an attack mitigation mode of operation with respect to said first packet flow. The switching from the monitoring mode of operation to the attack mitigation mode of operation including generating the control information including the mask, and sending the generated control information including the mask corresponding to the range of expected packet values to the switch.

In some embodiments, the processor of the first device is further configured to control the first device not to send to the switch or to the control device mask information to be used for determining which packets in said first packet flow should be dropped prior to detecting a condition indicating an attack with regard to said first packet flow.

In some embodiments of the exemplary communications system the aforementioned switch through which packets of the first packet flow pass includes a processor. The processor included in the switch is configured to control the switch to give a higher priority to packets corresponding to the first flow which include a value matching the mask than to packets in the first flow which do not include a value which match the mask. In some embodiments, the mask specifies a range of sequence numbers.

In some embodiments of the communications system the processor included in the first device is further configured to control the first device to communicate an updated mask to the switch or the control device which controls the switch, prior to the range of packets corresponding to the mask being outside an updated expected packet range generated by the first device in response to receipt of packets in the first packet flow. In most, but not all of such embodiments, the processor included in the first device is further configured to control the first device to generate the updated expected packet range based on a received packet sequence value and a packet window sequence range which is a function of the latest (e.g., highest) packet sequence number received in the first packet flow. In some embodiments, the first packet flow includes encrypted packets; and the processor in the first device is further configured to control the first device as part of the monitoring for a condition indicating an attack with respect to the first packet flow to: perform a decryption operation on the received encrypted packets; and determine that there is an attack when the first device is unable to successful decrypt a larger than expected portion of the received packets. In some embodiments of the communications system the sequence number of the encrypted packets is transmitted in the clear (i.e., without being encrypted).

In some embodiments of the exemplary communications system, the sequence numbers are packet sequence numbers or Internet Protocol version 4 identification numbers (IPv4 ID field) or Internet Protocol version 6 identification numbers (IPv6 ID field).

In some embodiments, the first packet flow is a flow of Secure Real-Time Transport Protocol packets and the packet sequence numbers are Secure Real-Time Transport Protocol packet sequence numbers.

In some embodiments, the first device is a Session Border Controller, the switch is an OpenFlow switch and the controller is a Software Defined Network Controller.

In some embodiments, the processor in the first device is further configured to control the first device to negotiate parameters for the first packet flow including addressing information for both endpoints of the first packet flow including the local IP address, the local UDP port, the remote IP address, the remote UDP port and the transport protocol. The negotiated parameters are sometimes referred to as a 5-tuple.

In some embodiments, the processor of the first device is further configured to control the first device to send control information to the switch through which packets of the first packet flow pass or to the control device which controls the switch instructing the switch to filter out packets from the first packet flow which do not contain the negotiated local IP address, the local UDP port, the remote IP address, the remote UDP port and the transport protocol for the first packet flow.

In some embodiments, the processor of the first device is further configured to control the first device to determine whether the mitigation operations undertaken have been effective; and when the determination is that the mitigation operations undertaken have not been effective to change at least one of the local IP address and local UDP port for the first packet flow. Changing at least one of the local IP address and local UDP port for the first packet flow includes in some embodiments sending a signaling message, e.g., a SIP reINVITE message or a SIP UPDATE message, to an endpoint device of the first packet flow. In some such embodiments, the processor of the first device is further configured to control the first device to send control information to update the filter of the switch to reflect the changes in the at least one of the local IP address and local UDP port to the switch through which the packets of the first packet flow pass or to the control device which controls the switch through which the packets of the first packet flow pass.

Figure 10:
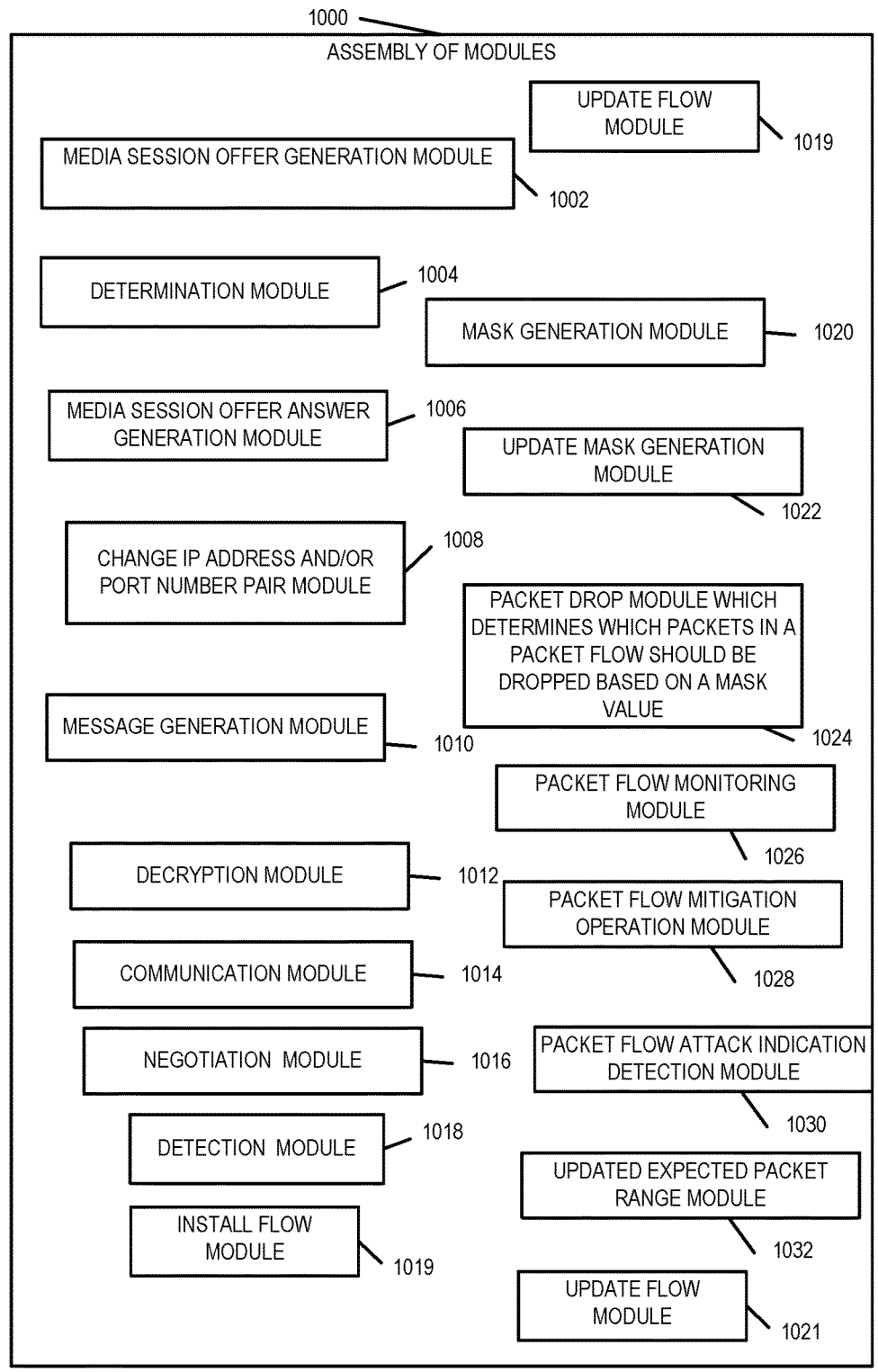
FIG. 10 illustrates an exemplary assembly of modules in accordance with one embodiment of the present invention.

Assembly of modules 1000 illustrated in FIG. 10 is an exemplary assembly of modules in one accordance with one embodiment of the present invention which may be, and in some embodiments is, used in the SBC 300 as either the assembly of modules 318 and/or the assembly of module 319. In some embodiments one or more modules of the assembly of modules 1000 is included in the assembly of modules 318 and/or the assembly of modules 319. One or more of the modules in the assembly of modules 1000 may be used in the switch device 400 in the assembly of modules 419 and/or assembly of modules 418. Similarly one or more of the modules of the assembly of modules 1000 may be included in the user equipment device/remote device 200 assembly of modules 219 and/or 218. The assembly of modules includes a media session offer generation module 1002, a determination module 1004, a media session offer answer generation module 1006, a change IP address and/or port number pair module 1008, a message generation module 1010, a decryption module 1012, a communications module 1014, a session parameter negotiation module 1016, a detection module 1018, an install flow module 1019, a mask generation module 1020, an update flow module 1021, an update mask generation module 1022, a packet drop module which determines which packets in a packet flow should be dropped based on a mask value 1024, a packet flow monitoring module, a packet flow mitigation operation module 1028, a packet flow attack indication detection module 1030, and an updated expected packet range module. In some embodiments the determination module 1004 is a determinator device which is used for making determinations.

The media session offer generation module 1002 is configured to generate a media session offer such as for example a SIP INVITE message including an SDP offer message for a media session such as a SRTP packet flow.

The media session offer answer generation module 1006 is configured to generate an answer to a media session offer that is received. The answer may be for example a SIP 200 answer message including an SDP answer message.

The negotiation module 1016 is configured to negotiate the parameters of media session such as for example a SRTP media session for a VOIP call. The negotiated parameters may, and in some embodiments do include, a local IP address, local UDP port, remote IP address, remote UDP port and the transport protocol to be used for the media session.

The change IP address and/or port number pair module 1008 is configured to change an IP address and/or port number, e.g., a local IP address and/or port number, on which a media session is currently being received from the negotiated IP address and/or port number for the media session corresponding to a packet flow.

The message generation module 1010 is configured to generate messages for communicating signals, control information and instructions. The message generation module 1010 is configured to generate messages in a variety of different formats in accordance with the various protocols described herein.

The decryption module 1012 is configured to decrypt encrypted packets such as for example SRTP packets. The decryption module 1012 in some embodiments also performs a validation operation on the decrypted packet to determine whether the packet is a valid packet or not.

The communication module 1014 is configured to transmit and receive signals, information and/or messages in various formats with other devices.

The detection module 1018 is configured to detect an attack such as denial of service attack.

The packet flow attack indication detection module 1030 is configured to detect conditions indicative of an attack such as for example a denial of service attack.

The mask generation module 1020 is configured to generate a mask corresponding to a range of expected packet values.

The updated expected packet range module 1032 is configured to generate an updated expected packet range based on a received packet sequence value and a packet window sequence range which is a function of the latest, e.g., highest, packet sequence number received in a packet flow.

The update mask generation module 1022 is configured to generate an updated expected packet range mask based on a generated updated expected packet range.

The packet flow monitoring module 1026 is configured to monitor a packet flow for a condition indicating an attack such as for example an excessive number of failures. In some embodiments, the packet flow monitoring module includes the packet flow attack indication detection module 1030. In some embodiments, the packet flow monitoring module 1026 tracks the number of packets which otherwise match the stream but are rejected due to SRTP failures. In some embodiments, the monitoring module is configured to determine when the number of SRTP failures for a stream or flow being monitored equals or exceeds a predetermined threshold.

The packet flow mitigation module 1028 is configured to implement one or more determined attack mitigation countermeasure operations.

The determination module 1004 is configured to perform various determinations including the determination of which attack countermeasure operations are to be implemented, the determination of when the number of SRTP failures equals or exceeds a predetermined threshold, the determination of whether the attack conditions for a packet flow are no longer present, the SRTP SEQ window mask for the current interval, the determination of the SRTP SEQ window mask for the next interval, the determination of IP ID window mask for the current interval, the determination of the IP ID window mask for the next interval, whether received packet sequence numbers or the received packet IP ID of packets of a packet flow under consideration are near the interval end, the determination of new SBC local IP address and/or port to use for communicating media of a media session.

The install flow module 1019 is configured to install flows on a switch such as for example the F2/M2 based on 5-tuple and SEQ window mask with priority P0 and Rate R2. The update flow module 1021 is configured to update flows on a switch such as for example the flow F2/M2 with a new SEQ window mask.

The techniques of various embodiments may be implemented using software, hardware and/or a combination of software and hardware. Various embodiments are directed to apparatus, e.g., session border controllers, controllers including SDN controllers, switches including SDN switches, telecommunications systems, network nodes and/or network equipment devices. Various embodiments are also directed to methods, e.g., method of controlling and/or operating devices, session border controllers, user devices, OpenFlow switches, SDN switches, SDN controller, real-time communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more modules to perform the steps corresponding to one or more methods, for example, message reception, signal processing, sending, comparing, determining and/or transmission steps. Thus, in some embodiments various features are implemented using modules or in some embodiments logic such as for example logic circuits. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, switch or controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving at a first device packets of a first packet flow;
operating the first device in a monitoring mode of operation, said operating the first device in said monitoring mode of operation including operating the first device to monitor for a condition indicating an attack with respect to said first packet flow;
in response to detecting a condition indicating an attack with respect to the first packet flow, operating the first device to switch from said monitoring mode of operation to an attack mitigation mode of operation with respect to said first packet flow, said switching from the monitoring mode of operation to the attack mitigation mode of operation including sending, from the first device, control information to a switch through which packets of the first packet flow pass or to a control device which controls said switch, said control information including a mask corresponding to a range of expected packet values;
operating the switch to give a higher priority to packets corresponding to said first packet flow which include a value matching said mask than to packets in said first packet flow which do not include a value matching said mask; and
operating said first device to communicate an updated mask to the switch or the control device which controls said switch, prior to the range of packets corresponding to said mask being outside an updated expected packet range generated by said first device in response to receipt of packets in said first packet flow, said updated expected packet range being generated by the first device based on a received packet sequence value and a packet window sequence range which is a function of the latest packet sequence number received in said first packet flow.

2. The method of claim 1, wherein said first packet flow includes encrypted packets; and
wherein operating the first device to monitor for a condition indicating an attack includes:
operating the first device to perform a decryption operation on the received encrypted packets; and
determining that there is an attack when the first device is unable to successfully decrypt a larger than expected portion of the received packets.

3. The communications method of claim 1 wherein the first device negotiates parameters for the first packet flow including addressing information for both endpoints of the first packet flow, said parameters including a local IP address, a local UDP port, a remote IP address, a remote UDP port and a transport protocol.

4. The communications method of claim 3 wherein the first device sends control information to the switch or to the control device which controls the switch instructing the switch to filter out packets from the first packet flow which do not contain the negotiated local IP address, the local UDP port, the remote IP address, the remote UDP port and the transport protocol for the first packet flow.

5. The communications method of claim 4 further including:
determining, by the first device, whether the mitigation operations undertaken have been effective; and
when the determination is that the mitigation operations undertaken have not been effective, operating the first device to change at least one of the local IP address and local UDP port for the first packet flow.

6. The communications method of claim 5, wherein operating the first device to change at least one of the local IP address and local UDP port for the first packet flow includes sending a signaling message to an endpoint device of the first packet flow, the method further including:
sending, from the first device, control information to the switch or to the control device to update the filter of the switch to reflect the changes in the at least one of the local IP address and local UDP port.

7. The method of claim 1, wherein mask information to be used for determining which packets in said first packet flow should be dropped is not sent to the switch or to the control device prior to detecting a condition indicating an attack with regard to said first packet flow.

8. The method of claim 1, wherein said mask specifies a range of sequence numbers.

9. The method of claim 1, wherein said first device is a Session Border Controller.

10. A communications system comprising:
a first device, said first device including:
an Input/Output interface for receiving packets of a first packet flow and sending control information to a switch through which packets of the first packet flow pass or to a control device which controls said switch, said control information including a mask corresponding to a range of expected packet values; and
a processor, said processor being configured to:
(i) control said first device to monitor for a condition indicating an attack with regard to said first packet flow when said first device is in a monitoring mode of operation with respect to said first packet flow;
(ii) control said first device to switch in response to detecting a condition indicating an attack with respect to the first packet flow from said monitoring mode of operation to an attack mitigation mode of operation with respect to said first packet flow, said switching from the monitoring mode of operation to the attack mitigation mode of operation including:
generating said control information including said mask, and
sending said control information including the mask corresponding to the range of expected packet values to said switch; and
(iii) control said first device to communicate an updated mask to the switch or the control device which controls said switch, prior to the range of packets corresponding to said mask being outside an updated expected packet range generated by said first device in response to receipt of packets in said first packet flow, said updated expected packet range being generated by the first device based on a received packet sequence value and a packet window sequence range which is a function of the latest packet sequence number received in said first packet flow.

11. The communications system of claim 10, wherein said processor is further configured to control said first device not to send to the switch or to the control device mask information to be used for determining which packets in said first packet flow should be dropped prior to detecting a condition indicating an attack with regard to said first packet flow.

12. The communications system of claim 10, wherein said switch includes a processor, said processor in said switch configured to control said switch to give a higher priority to packets corresponding to said first packet flow which include a value matching said mask than to packets in said first packet flow which do not include a value matching said mask.

13. The communications system of claim 12, wherein said mask specifies a range of sequence numbers.

14. The communications system of claim 10, wherein said first packet flow includes encrypted packets; and
    wherein said control said first device to monitor for a condition indicating an attack with regard to said first packet flow includes:
        controlling the first device to perform a decryption operation on the received encrypted packets; and
        controlling said first device to determine that there is an attack when the first device is unable to successfully decrypt a larger than expected portion of the received packets.

15. The communications system of claim 10 wherein the processor of the first device is further configured to control the first device to negotiate parameters for the first packet flow including addressing information for both endpoints of the first packet flow, said parameters including a local IP address, a local UDP port, a remote IP address, a remote UDP port and a transport protocol.

16. The communications system of claim 15 wherein the processor of the first device is further configured to control the first device to send control information to the switch or to the control device which controls the switch instructing the switch to filter out packets from the first packet flow which do not contain the negotiated local IP address, the local UDP port, the remote IP address, the remote UDP port and the transport protocol for the first packet flow.

17. The communications system of claim 16 wherein the processor of the first device is further configured to control the first device to:
    determine whether the mitigation operations undertaken have been effective; and
    when the determination is that the mitigation operations undertaken have not been effective, to change at least one of the local IP address and local UDP port for the first packet flow.

18. The communications system of claim 17,
    wherein said to change at least one of the local IP address and local UDP port for the first packet flow includes sending a signaling message to an endpoint device of the first packet flow, and
    wherein said processor of the first device is further configured to control the first device to send control information to the switch or to the control device to update the filter of the switch to reflect the changes in the at least one of the local IP address and local UDP port.

19. The communications system of claim 10, wherein the first device is a Session Border Controller.

20. The communications system of claim 19, wherein the first packet flow is a Secure Real-time Transport Protocol packet flow.

* * * * *